(12) United States Patent
Jackson et al.

(10) Patent No.: US 10,268,513 B2
(45) Date of Patent: Apr. 23, 2019

(54) COMPUTING RESOURCE ALLOCATION OPTIMIZATION

(71) Applicant: NICE Ltd., Ra'anana (IL)

(72) Inventors: Martin Peter Jackson, Staines Upon Thames (GB); Iain James Soars, Fleet (GB); Daniel Thomas Chappell-Edwards, Twickenham (GB)

(73) Assignee: Nice Ltd., Ra'anana (IL)

( * ) Notice: Subject to any disclaimer, the term of this patent is extended or adjusted under 35 U.S.C. 154(b) by 307 days.

(21) Appl. No.: 15/389,992

(22) Filed: Dec. 23, 2016

(65) Prior Publication Data
US 2018/0181439 A1    Jun. 28, 2018

(51) Int. Cl.
*G06F 9/50*    (2006.01)

(52) U.S. Cl.
CPC .......... *G06F 9/5005* (2013.01); *G06F 9/5016* (2013.01); *G06F 9/5027* (2013.01); *G06F 9/5083* (2013.01); *G06F 9/50* (2013.01)

(58) Field of Classification Search
None
See application file for complete search history.

(56) References Cited

U.S. PATENT DOCUMENTS

2012/0233315 A1* 9/2012 Hoffman ............... G06F 9/5072
                                                          709/224
2018/0234492 A1* 8/2018 Moscibroda ............ G06F 9/505

* cited by examiner

Primary Examiner — Qing Yuan Wu
(74) Attorney, Agent, or Firm — Pearl Cohen Zedek Latzer Baratz LLP

(57) ABSTRACT

A computing system may be configured to implement a plurality of agents each associated with a predetermined number of CPU cores and a predetermined amount of memory and to receive requests to perform tasks. A request may specify the number of CPU cores and amount of memory for performing the task. Allocation of resources may include determining multiple allocation profiles, each describing a possible allocation of cores and memory to the task from currently available CPU cores and memory associated with the agents. For each agent and for each of said allocation profiles, respective efficiency measures for memory usage and CPU usage may be calculated. An allocation profile may be selected using said calculated memory usage and CPU usage efficiency measures.

20 Claims, 23 Drawing Sheets

Request for 2 cores @ 2GB/core – random allocation

*Key: normal font = available, bold = allocated, italics = unusable*

Request for 2 cores @ 2GB/core – balanced allocation

*Key: normal font = available, bold = allocated, italics = unusable*

Request for 2 cores with 1 GB/core plus 1GB baseline per server – blind allocation

*Key: normal font = available, bold = allocated, underlined = shared*

Request for 2 cores with 1 GB/core plus 1GB baseline per server – balanced allocation

*Key: normal font = available, bold = allocated, underlined = shared*

| Request | |
|---|---|
| Cores | 5 |
| MemBase (MB) | 512 |
| MemPerThread (MB) | 512 |

| Calculation Grid | | |
|---|---|---|
| Agent | Cores | Memory MB |
| A | 4 | 2048 |
| B | 4 | 4096 |
| C | 6 | 4096 |

| Allocation Profile | Score | CPU total | +ve MEM | -ve MEM | CPU Costs % | | | Memory Costs % | | |
|---|---|---|---|---|---|---|---|---|---|---|
| | | | | | A | B | C | A | B | C |
| B1 C4 | 0.0417 | 0.0000 | 0.0417 | 0.0000 | 0.0 | 0.0 | 0.0 | 0.0 | 0.0 | 4.2 |
| C5 | 0.0833 | 0.0000 | 0.0833 | 0.0000 | 0.0 | 0.0 | 0.0 | 0.0 | 0.0 | 8.3 |
| B2 C3 | 0.1250 | 0.0000 | 0.1250 | 0.0000 | 0.0 | 0.0 | 0.0 | 0.0 | 12.5 | 0.0 |
| B3 C2 | 0.2917 | 0.0000 | 0.2500 | 0.0417 | 0.0 | 0.0 | 0.0 | 0.0 | 25.0 | -4.2 |
| A1 B1 C3 | 0.3333 | 0.0833 | 0.0000 | 0.2500 | 8.3 | 0.0 | 0.0 | -25.0 | 0.0 | 0.0 |
| A1 C4 | 0.3750 | 0.0833 | 0.0417 | 0.2500 | 8.3 | 0.0 | 0.0 | -25.0 | 0.0 | 4.2 |
| A2 C3 | 0.4167 | 0.1667 | 0.0000 | 0.2500 | 16.7 | 0.0 | 0.0 | -25.0 | 0.0 | 0.0 |
| B4 C1 | 0.4583 | 0.0000 | 0.3750 | 0.0833 | 0.0 | 0.0 | 0.0 | 0.0 | 37.5 | -8.3 |
| A2 B1 C2 | 0.4584 | 0.1667 | 0.0000 | 0.2917 | 16.7 | 0.0 | 0.0 | -25.0 | 0.0 | -4.2 |
| A1 B2 C2 | 0.5000 | 0.0833 | 0.1250 | 0.2917 | 8.3 | 0.0 | 0.0 | -25.0 | 12.5 | -4.2 |
| A3 C2 | 0.5417 | 0.2500 | 0.0000 | 0.2917 | 25.0 | 0.0 | 0.0 | -25.0 | 0.0 | -4.2 |
| A3 B1 C1 | 0.5833 | 0.2500 | 0.0000 | 0.3333 | 25.0 | 0.0 | 0.0 | -25.0 | 0.0 | -8.3 |
| A2 B2 C1 | 0.6250 | 0.1667 | 0.1250 | 0.3333 | 16.7 | 0.0 | 0.0 | -25.0 | 12.5 | -8.3 |
| A3 B2 | 0.6250 | 0.2500 | 0.1250 | 0.2500 | 25.0 | 0.0 | 0.0 | -25.0 | 12.5 | 0.0 |
| A1 B3 C1 | 0.6666 | 0.0833 | 0.2500 | 0.3333 | 8.3 | 0.0 | 0.0 | -25.0 | 25.0 | -8.3 |
| A2 B3 | 0.6667 | 0.1667 | 0.2500 | 0.2500 | 16.7 | 0.0 | 0.0 | -25.0 | 25.0 | 0.0 |
| A1 B4 | 0.7083 | 0.0833 | 0.3750 | 0.2500 | 8.3 | 0.0 | 0.0 | -25.0 | 37.5 | 0.0 |

Fig. 19 – Example 2 – score calcuation for three agents all having different OAR values

| Request | | |
|---|---|---|
| Cores | 16 | |
| MemBase (MB) | 4096 | |
| MemPerThread (MB) | 0 | |

| Calculation Grid | | |
|---|---|---|
| Agent | Cores | Memory MB |
| A | 8 | 8192 |
| B | 8 | 8192 |
| C | 8 | 8192 |
| D | 8 | 8192 |

| Allocation Profile | Score | CPU total | +ve MEM | -ve MEM | CPU Costs % | | | | Memory Costs % | | | |
|---|---|---|---|---|---|---|---|---|---|---|---|---|
| | | | | | A | B | C | D | A | B | C | D |
| A4 B4 C4 D4 | 0.0000 | 0.0000 | 0.0000 | 0.0000 | 0.0 | 0.0 | 0.0 | 0.0 | 0.0 | 0.0 | 0.0 | 0.0 |
| A3 B4 C4 D5 | 0.2500 | 0.0000 | 0.1250 | 0.1250 | 0.0 | 0.0 | 0.0 | 0.0 | -12.5 | 0.0 | 0.0 | 12.5 |
| A3 B4 C5 D4 | 0.2500 | 0.0000 | 0.1250 | 0.1250 | 0.0 | 0.0 | 0.0 | 0.0 | -12.5 | 0.0 | 12.5 | 0.0 |
| A3 B5 C4 D4 | 0.2500 | 0.0000 | 0.1250 | 0.1250 | 0.0 | 0.0 | 0.0 | 0.0 | -12.5 | 12.5 | 0.0 | 0.0 |
| A4 B3 C4 D5 | 0.2500 | 0.0000 | 0.1250 | 0.1250 | 0.0 | 0.0 | 0.0 | 0.0 | 0.0 | -12.5 | 0.0 | 12.5 |
| A4 B3 C5 D4 | 0.2500 | 0.0000 | 0.1250 | 0.1250 | 0.0 | 0.0 | 0.0 | 0.0 | 0.0 | -12.5 | 12.5 | 0.0 |
| A4 B4 C3 D5 | 0.2500 | 0.0000 | 0.1250 | 0.1250 | 0.0 | 0.0 | 0.0 | 0.0 | 0.0 | 0.0 | -12.5 | 12.5 |
| A4 B4 C5 D3 | 0.2500 | 0.0000 | 0.1250 | 0.1250 | 0.0 | 0.0 | 0.0 | 0.0 | 0.0 | 0.0 | 12.5 | -12.5 |
| A4 B5 C3 D4 | 0.2500 | 0.0000 | 0.1250 | 0.1250 | 0.0 | 0.0 | 0.0 | 0.0 | 0.0 | 12.5 | -12.5 | 0.0 |
| A4 B5 C4 D3 | 0.2500 | 0.0000 | 0.1250 | 0.1250 | 0.0 | 0.0 | 0.0 | 0.0 | 0.0 | 12.5 | 0.0 | -12.5 |
| A5 B3 C4 D4 | 0.2500 | 0.0000 | 0.1250 | 0.1250 | 0.0 | 0.0 | 0.0 | 0.0 | 12.5 | -12.5 | 0.0 | 0.0 |
| A5 B4 C3 D4 | 0.2500 | 0.0000 | 0.1250 | 0.1250 | 0.0 | 0.0 | 0.0 | 0.0 | 12.5 | 0.0 | -12.5 | 0.0 |
| A5 B4 C4 D3 | 0.2500 | 0.0000 | 0.1250 | 0.1250 | 0.0 | 0.0 | 0.0 | 0.0 | 12.5 | 0.0 | 0.0 | -12.5 |
| B4 C4 D8 | 0.5000 | 0.0000 | 0.5000 | 0.0000 | 0.0 | 0.0 | 0.0 | 0.0 | 0.0 | 0.0 | 0.0 | 50.0 |
| B4 C8 D4 | 0.5000 | 0.0000 | 0.5000 | 0.0000 | 0.0 | 0.0 | 0.0 | 0.0 | 0.0 | 0.0 | 50.0 | 0.0 |
| B8 C4 D4 | 0.5000 | 0.0000 | 0.5000 | 0.0000 | 0.0 | 0.0 | 0.0 | 0.0 | 0.0 | 50.0 | 0.0 | 0.0 |
| A4 C4 D8 | 0.5000 | 0.0000 | 0.5000 | 0.0000 | 0.0 | 0.0 | 0.0 | 0.0 | 0.0 | 0.0 | 0.0 | 50.0 |
| A4 C8 D4 | 0.5000 | 0.0000 | 0.5000 | 0.0000 | 0.0 | 0.0 | 0.0 | 0.0 | 0.0 | 0.0 | 50.0 | 0.0 |
| A4 B4 D8 | 0.5000 | 0.0000 | 0.5000 | 0.0000 | 0.0 | 0.0 | 0.0 | 0.0 | 0.0 | 0.0 | 0.0 | 50.0 |

Fig. 20 – Example 3 – High Baseline Memory Request with No Memory Per Thread

| Generic Profile | Example | Score | +ve MEM | -ve MEM | Memory Costs % | | | | Post-Allocation OAR (MB/Core) | | | | StdDev |
|---|---|---|---|---|---|---|---|---|---|---|---|---|---|
| | | | | | A | B | C | D | A | B | C | D | |
| 4-4-4-8 | A4 B4 C4 D8 | 0.5000 | 0.5000 | 0.0000 | 0.0 | 0.0 | 0.0 | 50.0 | 1024 | 1024 | 1024 | 0 | 0.000 |
| 5-5-5-5 | A5 B5 C5 D5 | 0.5000 | 0.5000 | 0.0000 | 12.5 | 12.5 | 12.5 | 12.5 | 1365 | 1365 | 1365 | 1365 | 0.000 |
| 4-5-5-6 | A4 B5 C5 D6 | 0.5000 | 0.5000 | 0.0000 | 0.0 | 12.5 | 12.5 | 25.0 | 1024 | 1365 | 1365 | 2048 | 371.959 |
| 4-4-6-6 | A4 B4 C6 D6 | 0.5000 | 0.5000 | 0.0000 | 0.0 | 0.0 | 25.0 | 25.0 | 1024 | 1024 | 2048 | 2048 | 512.000 |
| 4-4-5-7 | A4 B4 C5 D7 | 0.5000 | 0.5000 | 0.0000 | 0.0 | 0.0 | 12.5 | 37.5 | 1024 | 1024 | 1365 | 4096 | 1288.505 |
| 3-4-5-8 | A3 B4 C5 D8 | 0.7500 | 0.6250 | 0.1250 | -12.5 | 0.0 | 12.5 | 50.0 | 819 | 1024 | 1365 | 0 | 225.269 |
| 3-5-6-6 | A3 B5 C6 D6 | 0.7500 | 0.6250 | 0.1250 | -12.5 | 12.5 | 25.0 | 25.0 | 819 | 1365 | 2048 | 2048 | 515.402 |
| 3-5-5-7 | A3 B5 C5 D7 | 0.7500 | 0.6250 | 0.1250 | -12.5 | 12.5 | 12.5 | 37.5 | 819 | 1365 | 1365 | 4096 | 1280.796 |
| 3-4-6-7 | A3 B4 C6 D7 | 0.7500 | 0.6250 | 0.1250 | -12.5 | 0.0 | 25.0 | 37.5 | 819 | 1024 | 2048 | 4096 | 1298.301 |
| 4-8-8-0 | A4 B8 C8 | 1.0000 | 1.0000 | 0.0000 | 0.0 | 50.0 | 50.0 | 0.0 | 1024 | 0 | 0 | 1024 | 0.000 |
| 2-5-5-8 | A2 B5 C5 D8 | 1.0000 | 0.7500 | 0.2500 | -25.0 | 12.5 | 12.5 | 50.0 | 683 | 1365 | 1365 | 0 | 321.812 |
| 6-6-8-0 | A6 B6 C8 | 1.0000 | 1.0000 | 0.0000 | 25.0 | 25.0 | 50.0 | 0.0 | 2048 | 2048 | 0 | 1024 | 482.718 |
| 3-3-6-8 | A3 B3 C6 D8 | 1.0000 | 0.7500 | 0.2500 | -12.5 | -12.5 | 25.0 | 50.0 | 819 | 819 | 2048 | 0 | 579.262 |
| 2-4-6-8 | A2 B4 C6 D8 | 1.0000 | 0.7500 | 0.2500 | -25.0 | 0.0 | 25.0 | 50.0 | 683 | 1024 | 2048 | 0 | 580.155 |
| 2-6-6-6 | A2 B6 C6 D6 | 1.0000 | 0.7500 | 0.2500 | -25.0 | 25.0 | 25.0 | 25.0 | 683 | 2048 | 2048 | 2048 | 591.207 |
| 2-5-6-7 | A2 B5 C6 D7 | 1.0000 | 0.7500 | 0.2500 | -25.0 | 12.5 | 25.0 | 37.5 | 683 | 1365 | 2048 | 4096 | 1277.152 |
| 6-7-7-0 | A6 B7 C7 | 1.0000 | 1.0000 | 0.0000 | 25.0 | 37.5 | 37.5 | 0.0 | 2048 | 4096 | 4096 | 0 | 1330.215 |
| 5-7-8-0 | A5 B7 C8 | 1.0000 | 1.0000 | 0.0000 | 12.5 | 37.5 | 50.0 | 0.0 | 1365 | 4096 | 0 | 1024 | 1374.782 |
| 2-4-7-7 | A2 B4 C7 D7 | 1.0000 | 0.7500 | 0.2500 | -25.0 | 0.0 | 37.5 | 37.5 | 683 | 1024 | 4096 | 4096 | 1625.818 |
| 3-3-7-7 | A3 B3 C7 D7 | 1.0000 | 0.7500 | 0.2500 | -12.5 | -12.5 | 37.5 | 37.5 | 819 | 819 | 4096 | 4096 | 1638.400 |
| 1-5-6-8 | A1 B5 C6 D8 | 1.2500 | 0.8750 | 0.3750 | -37.5 | 12.5 | 25.0 | 50.0 | 585 | 1365 | 2048 | 0 | 597.651 |
| 1-6-6-7 | A1 B6 C6 D7 | 1.2500 | 0.8750 | 0.3750 | -37.5 | 25.0 | 25.0 | 37.5 | 585 | 2048 | 2048 | 4096 | 1249.866 |
| 1-4-7-8 | A1 B4 C7 D8 | 1.2500 | 0.8750 | 0.3750 | -37.5 | 0.0 | 37.5 | 50.0 | 585 | 1024 | 4096 | 0 | 1561.904 |
| 2-3-7-8 | A2 B3 C7 D8 | 1.2500 | 0.8750 | 0.3750 | -25.0 | -12.5 | 37.5 | 50.0 | 683 | 819 | 4096 | 0 | 1577.864 |
| 1-5-7-7 | A1 B5 C7 D7 | 1.2500 | 0.8750 | 0.3750 | -37.5 | 12.5 | 37.5 | 37.5 | 585 | 1365 | 4096 | 4096 | 1584.574 |
| 2-2-8-8 | A2 B2 C8 D8 | 1.5000 | 1.0000 | 0.5000 | -25.0 | -25.0 | 50.0 | 50.0 | 683 | 683 | 0 | 0 | 0.000 |
| 1-3-8-8 | A1 B3 C8 D8 | 1.5000 | 1.0000 | 0.5000 | -37.5 | -12.5 | 50.0 | 50.0 | 585 | 819 | 0 | 0 | 117.029 |

Fig. 21 – Example 4 - Tie Breaking using Standard Deviation

COMPUTING RESOURCE ALLOCATION OPTIMIZATION

FIELD OF THE INVENTION

The present invention is in the field of computing systems and in particular to the allocation of computing resources in computing systems to perform particular tasks.

BACKGROUND OF THE INVENTION

A computing system may comprise hardware including one or more processors and memory, also known as resources. Additional resources may be included. Some computing systems may be regarded as dynamic systems in which the amount of resources may vary from time to time, for example depending on whether those resources are available or are being used in other computing systems. Processors may comprise central processing unit "CPU" cores as is well-known in the art. A "core" is a single processing unit. A computing system may comprise one or more physical machines, each comprising a certain amount of processing power, in terms of CPU cores, and a certain amount of memory.

A computing system may be configured to provide virtual resources, e.g. resources that are not necessarily precisely defined in terms of hardware, thus providing a virtual computing system, for example comprising multiple virtual machines "VM", each comprising one or more virtual cores and virtual memory. Such "virtualization" may be achieved through the use of virtualization software operating on physical resources. A "virtual" core may be equivalent to a physical core or it may for example share a physical core with one or more other virtual cores, for example on a time allocation basis. A virtual memory may for example comprise a subset or portion of a physical memory. A virtual machine may effectively emulate a physical machine.

A computing system may comprise one or more servers, e.g. processors combined with storage and other resources, and typically connected to devices serviced by the server via one or more networks, configured to manage access to a centralized resource or service in a network. A server may be a VM and a VM may be a server. A physical machine may implement (e.g., execute, instantiate, or otherwise operate) multiple VMs.

In a computing system, the performance of tasks may be controlled by one or more "agents" as is well known in the art. An agent may consist, wholly or partially, of software operating on or executed by one or more processors and thus a computing system may be configured, for example by suitable programming of processors, to implement, execute, instantiate, or otherwise operate, one or more agents. An agent may control other software or computer algorithms that cause a computing system to perform one or more tasks. Such software or computer algorithms are known in the art as "workers". Thus for example a "worker" may be an algorithm or program which when implemented in a computing system causes the system to perform a particular task. One agent may control workers of a particular kind, for example calculation workers. Alternatively, one agent may control different kinds of worker. A computer on which agent software is implemented may be a server managing access to a resource such as a calculation resource for example. An agent may be agnostic to the requestor for access to the resources and agnostic to the nature of the work itself. An agent may be associated with a predetermined amount of resources, such as a predetermined number of cores and a predetermined amount of memory. The predetermined amount of memory and number of cores may vary from time to time but may be predetermined prior to allocation of resources for the performance of a task. These cores and memory may be spread across more than one VM and/or more than one physical machine. Agents may operate under the control of a "manager" also consisting wholly or partially of software operating on one or more processors. Thus for example an agent may report to the manager the predetermined number of cores and memory associated with it and their utilization status, for example what proportion are in use and optionally what they are being used for and how long they are required for. This information may be used by the manager to allocated resources to tasks in response to incoming requests for tasks to be performed.

For the purpose of allocating agent resources to a task, agents can be represented as a computing "grid" or table including multiple agents each associated with a predetermined amount of cores and amount of memory, e.g. in gigabyte "GB" blocks or sections.

Some embodiments of the invention may be used in situations where remote servers, e.g. hosted on the internet, rather than local computing systems are used to do any of storing, managing and processing data, otherwise known as cloud computing.

The association or assignation of resources to agents may be performed in various ways as is known in the art. For example, initial core and memory values may be passed to an agent in an initial configuration process. In this way it is possible to associate with or assign to an agent or a set of agents all or part of the resources available on the physical or virtual machine on which the agent resides. For example:

A server A may be a physical machine with 16 GB memory and 8 CPU cores.

An agent A may run on Server A and be configured to register 14 GB and 8 CPU cores.

The Agent A does not then register all the memory of the physical machine, for example with a calculation service, 2 GB may be reserved for use by the machine operating system.

Additionally or Alternatively:

A server B may be a virtual machine with 8 GB memory and 8 CPU cores.

An agent B may run on Server B and be configured to register 6 GB and 4 cores.

There may be other processes running on this virtual machine and so only half the available cores may be registered for use within a calculation grid.

There are several other potential options including but not limited to:

specifying the initial resource values as percentages of the total memory and CPU of the server;

dynamically registering the amount of currently available memory and number of CPU cores, or a percentage thereof, at intervals, for example periodically, such as every N seconds;

using time-based profiles to control resources, e.g. more resources released during the night to handle batch loads;

using thresholds to control resources. e.g. only offer resources when there are more than 4 cores free and 8 GB memory free using external application programming interfaces "APIs" to create one or more new virtual machines each running a new agent to handle peak loads e.g. using elastic provisioning services on offer within cloud environments.

A challenge for the operation of computing systems is to ensure that resources are used as efficiently as possible.

Computing systems may be required to operate in a dynamic manner for example in order to be able to accommodate varying work-loads. For example, a computing system may receive requests to perform tasks such as calculations involving large amounts of data. A task may be finite such that computing resources may be freed for other uses once a task has been completed. A request need not specify which resources are to perform the task. It may simply specify the amount of resources required.

In a virtual or physical machine, memory capacity may be unusable if there is no available core to drive it and a core may be unusable if no memory is available.

SUMMARY OF THE INVENTION

Some embodiments of the invention provide methods and systems for allocating resources such as memory and CPU cores to a task. The computing system may be configured to implement a plurality of agents, each associated with a predetermined number of CPU cores and a predetermined amount of memory. The allocation of resources may include determining multiple allocation profiles, each describing a possible allocation of cores and memory to the task from currently available CPU cores and memory associated with the agents and selecting one of the allocation profiles. The selection may be performed by calculating respective efficiency measures for memory usage and CPU usage for each agent and for each of said allocation profiles. These measures may be used in the selection of an allocation profile. The selection may be performed in various ways, for example according to some embodiments of the invention a score is determined from the total of the efficiency measures and the selected profile may be one having the score indicating the greatest efficiency.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 19, 20 and 21 are tables showing examples of score calculation according to some embodiments of the invention.

Figure 1:
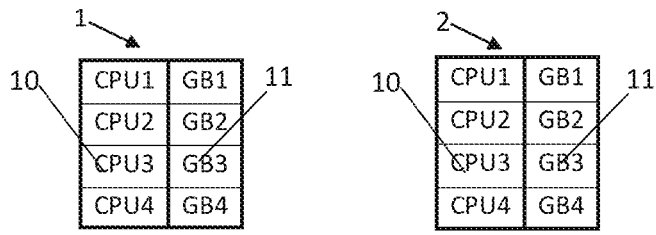
FIG. 1 is a diagram of a computing system architecture according to some embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Some embodiments of the invention may be used to provide an interface to a computing system for the provision of resources to perform a task, for example to satisfy high-intensity workloads for sustained periods. Such an interface may be what is called "serverless" meaning that a request for resources does not need to specify a server or servers in the computing system on which the task is to be executed.

A 16 core physical machine may host 8 VMs each with 8 CPU cores, i.e. a total of 64 virtual cores. Through the use of virtualization software, loading on the physical cores can be smoothed. The ability to achieve this smoothing effect and hence even out the load on the physical cores has driven virtualization of IT data centers in recent years. As a result of virtualization, less physical cores may be required.

It is possible for the workload to exceed the number of physical cores. Known techniques are available for handling short term spikes. However, when overloaded, virtualization software may share out CPU cycles across VMs. For example, if the physical CPU clock speed is 2 Ghz, then the machine has 16×2=32 Ghz of CPU power. When the demand is 32 virtual cores, then each VM may receive only 50% of the CPU cycles it is configured for, effectively slowing down the VM to a clock speed of 1 Ghz.

Virtual machines may be used in so-called "multi-tenant environments". In this context the term "tenant" may be used to refer to a group of users of a system who share a common access with specific privileges to a software instance. For example, a tenant may use the multi-tenant environment to perform calculations for a customer, providing calculation as a service "CaaS". CaaS is used for example in incentive compensation management "ICM" by organizations which outsource the calculation of employee remuneration based for example on sales performance one customer of CaaS may include multiple tenants, for example a tenant could refer to a single department within a customer.

Some embodiments of the invention provide methods and systems permitting the allocation of resources in a computing system in an efficient manner. Embodiments of the invention may be particularly useful in situations where a computing system receives a dynamic and unpredictable stream of requests to perform computing tasks.

The tasks for which resources may be allocated according to embodiments of the invention are not limited to particular kinds. Such tasks may include but are not limited to any kind of large computationally intensive process, report rendering, 3D graphics rendering, and data analysis. Embodiments of the invention are not limited to tasks which are performed on a regular basis and may be suitable for one-off requests for tasks to be performed. Some embodiments are particularly suitable for allocation of resources where demand for those resources is random or otherwise unpredictable. According to some embodiments of the invention the resources available for allocation may be in the same geographical location. Thus for example transmission times between resources may not need to be considered in selecting an allocation profile.

Some embodiments of the invention may use an open application programming interface, whereby they are not limited to certain kinds of task and can be used to allocate resources for any kind of task for which a CPU and memory requirement is specified. An API may provide a software developer with programmatic access to a proprietary software application. An open API is a publicly available API.

Some embodiments of the invention may be implemented in so-called "serverless" computing environments in which a cloud provider, or host, fully manages the starting and stopping of virtual machines as necessary to serve or respond to requests. Despite the name, it does not actually involve running code without servers. Serverless computing is so named because it does not require the purchase, rent or provisioning of servers or virtual machines for the back-end code to run on. Systems according to embodiments of the invention may not require the reservation of resources for particular tasks on a permanent basis but may permit resources to be allocated dynamically according to changing workloads from multiple requestors. The term serverless means that requests only need to specify the profile of the required calculations, and not on which servers they are to be executed. An allocation algorithm according to some embodiments of the present invention may determine the physical or virtual servers that will perform the work. With a serverless interface there is no need to have dedicated processes running to handle requests for each client e.g. a service according to some embodiments of the invention may manage processes to meet the incoming demand.

Some embodiments of the invention may be suitable for use in a scalable architecture whose capacity may be increased by addition of hardware or software, for example a horizontally scalable architecture in which capacity may be increased by connecting multiple hardware or software entities so that they work as a single logical unit.

Figure 15:
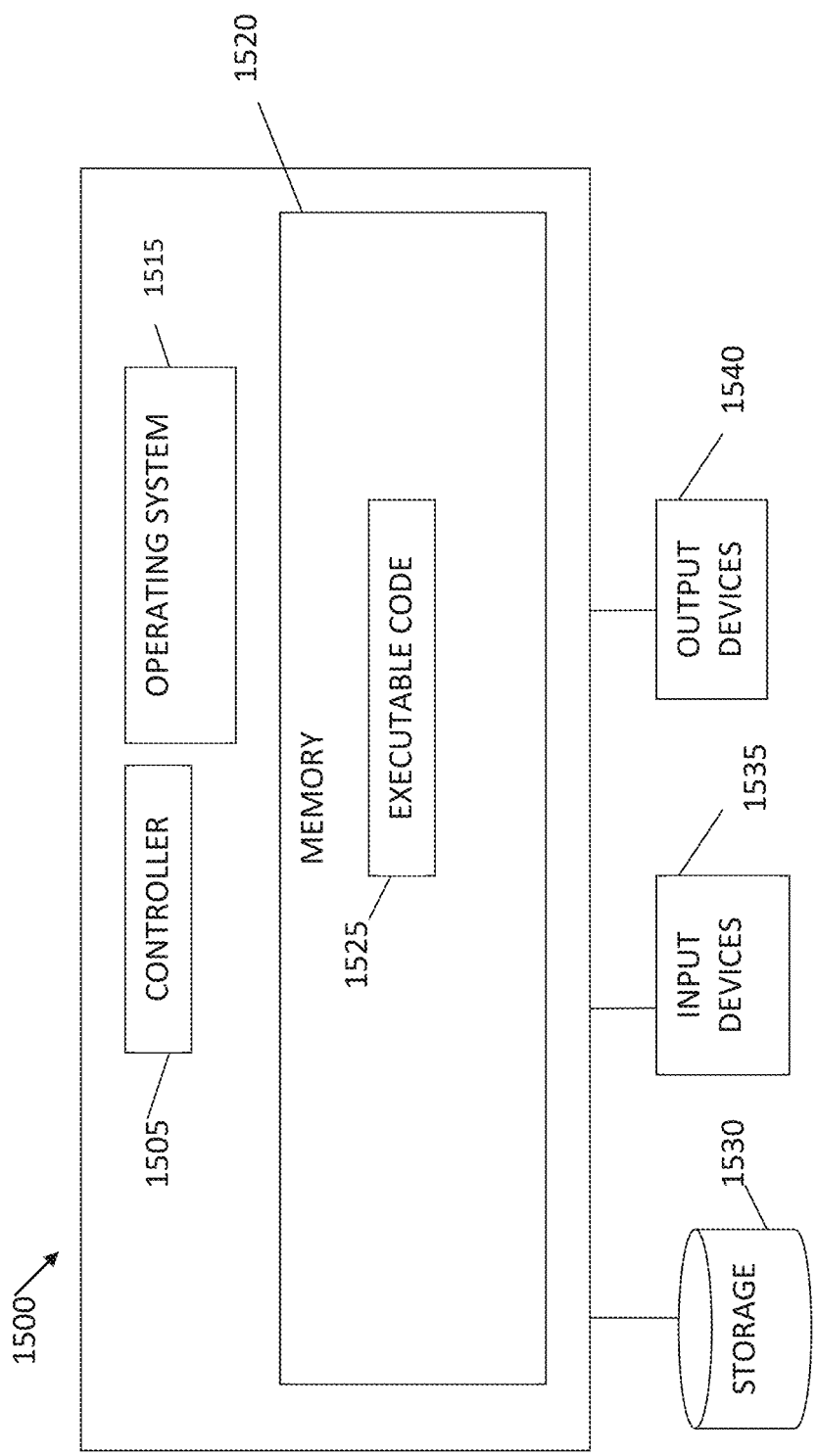
FIG. 15 shows a block diagram of an exemplary computing device according to embodiments of the present invention.

FIG. 1 is a diagram of a computing system architecture according to some embodiments of the invention. In the computing system of FIG. 1 processors and memory may be configured to provide two identical agents 1, 2. Each agent 1, 2 may be associated with or has assigned to it for example a processor 10 consisting of 4 CPU cores shown as a column labeled CPU1-CPU4, which may be part of a controller 1505 in a computing systems as shown in FIG. 15, and memory 11 comprising 4 GB of random access memory "RAM", shown in 1 GB sections shown as a column labeled GB1-GB4, which may be part of memory 1520 of a computing system as shown in FIG. 15. In other embodiments agents may be associated with other amounts of resources.

The system of FIG. 1 may receive a request to perform a task. The request may specify 2 CPU cores, and 2 GB RAM per core. The request may further include details of the task and may thus be a request to perform a particular task. According to some embodiments of the invention, resources associated with the agents may be allocated by various allocation strategies including for example:

a) "blindly", e.g. randomly, pick an agent, then if there is sufficient memory to allocate both cores to that agent the scheduling of the work can proceed, or b) try to balance the work across the available resources, for example allocate the first core to agent 1 and the second core to agent 2.

Figure 2A:
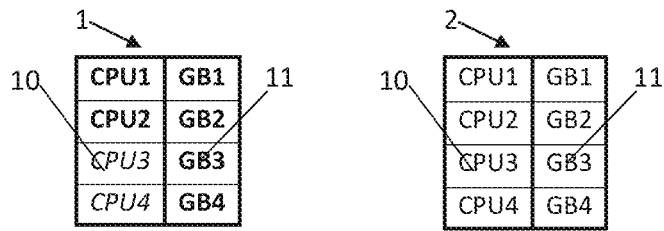
FIGS. 2A and 2B are diagrams of the computing system architecture of FIG. 1 showing the result of a possible allocation strategy according to some embodiments of the invention.

FIG. 2A shows the result of an allocation strategy that may have been performed by blind, or random, allocation. The result of the strategy is termed an allocation profile. A profile may be for example "11; 23" indicating that one core is to be allocated to agent 1 and three cores are to be allocated to agent 2. In the example shown in FIG. 2A, agent 1 was chosen, all 4 GB of agent 1 was allocated to the task along with cores CPU1 and CPU2. This leaves CPU3 and CPU4 of agent 1 unusable.

Figure 2B:
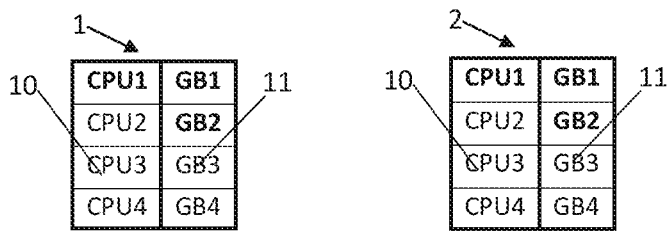

FIG. 2B shows the result of an allocation strategy that may have been performed in order to balance the work across the resources. In this case the request has been divided into units, or threads. The term "thread" is well known in the art to refer to a sequence of programmed instructions that can be managed independently. In the example of FIG. 2B, there is one core per thread. In the resulting allocation profile, one thread is allocated to each agent.

Profile a) shown in FIG. 2A leaves 4 cores and 4 GB memory free, all at agent 2. Profile b) shown in FIG. 2B leaves 6 cores and 4 GB memory free. In this scenario profile b) may be deemed preferable in terms of its ability to preserve CPU resource, but at the expense of fragmentation of the available memory.

Figure 3A:
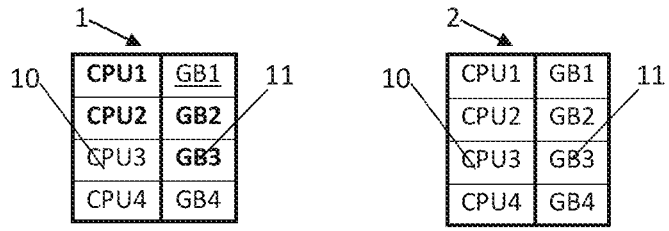
FIGS. 3A and 3B are diagrams of the computing system architecture of FIG. 1 showing the result of a possible allocation strategy according to some embodiments of the invention.
Figure 3B:
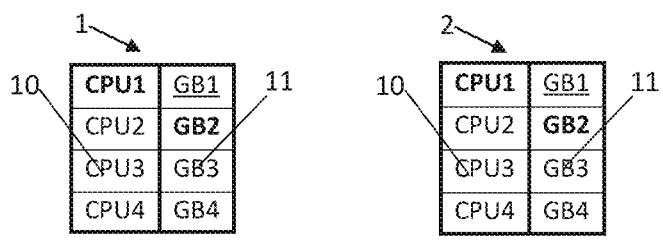

The system of FIG. 1 may alternatively receive a request which specifies details or requirements such as a baseline memory requirement, e.g. for supporting a shared cache or memory across parallel threads in a multithreaded process, which may be required for each agent of which resources are allocated to a task. FIGS. 3A and 3B show the profiles resulting from possible blind and balanced allocation strategies for an incoming request for two CPU cores with 1 GB per core plus 1 GB baseline. Even in this simple scenario it is no longer clear which is the better strategy. The blind or random allocation strategy leaves 6 free cores and 5 GB memory free. The balanced allocation strategy leaves 6 cores with only 4 GB memory free. The blind allocation strategy leaves more available memory than the balanced allocation strategy. The maximum amount of memory per core remaining from the blind allocation strategy is 2 GB. Also the blind allocation strategy can handle a request for up to 4 GB of memory.

In this scenario the blind allocation strategy is arguably better in terms of memory, as it preserves more total memory, and is less fragmented. However, it may be less efficient from a CPU balancing perspective as a request for a single core at 1 GB RAM would make the last core on agent 1 unusable, this reducing the total capacity of the grid for any additional concurrent requests.

In practice a computing system may be requested to perform tasks of different kinds with different requirements, not all of which require baseline memory. Therefore it is desirable to be able to accommodate such requests in such a manner that additional workloads can be accommodated as far as possible. For example in the field of ICM, a crediting calculation may not require baseline memory and conversely an incentive compensation calculation may require baseline memory.

Some embodiments of the present invention provide systems and methods that can handle a mixed workload of request types, from a variety of sources (e.g. customer instances), with an unpredictable schedule. Some embodiments of the invention may take the form of a resource allocation algorithm. Some embodiments of the invention may be used to allocate workloads from any source, including multiple kinds of source. Some embodiments of the invention may be used in the performance of CaaS in which requests may be received to perform different kinds of calculations, sometimes with different resource requirements. Other embodiments of the invention may be used to allocate resources for other kinds of computer operations.

Some calculation phases in tasks requested of computing systems are characterized by a heavy CPU load over a prolonged period and hence there may be significant resource savings attained by sharing the same execution servers to handle both. Some embodiments of the present invention may use a more sophisticated algorithm to allow a computing system to address the requirements of more complex usage scenarios. For example, the sharing of resources across multiple customers in a hosting environment, within a multi-department/tenant solution for a customer, across multiple development/test domains, e.g. user acceptance testing "UAT", development UAT "DEV", Pre-Production, to handle additional types of calculations.

A common challenge in the above scenarios is that the work may be unpredictable, may not be ordered sequentially, and concurrent requests for resources may be frequent. This means that it is desirable for a system to be able to balance current demands with the prospective arrival of additional work requests that also need to be handled efficiently. The more efficient the allocation algorithm the more work that can be performed concurrently, thus reducing the cost of operations and hence delivering a competitive advantage.

Referring again to the two scenarios described with reference to FIGS. 2A, 2B, 3A and 3B, it can be seen that a difference between them is that the blind or random allocation strategy resulted in fragmentation of the available CPU cores, whereas the balanced approach resulted in fragmentation of the available memory. It would be useful to provide an algorithm that could balance both types of resource, so as to preserve the configuration of free cores and memory that would best satisfy further requests received during the execution lifetime of the active allocations. In the ICM domain where overnight batch runs can take hours to process this may better equip a system to meet the requirements of a grid/cloud environment shared between multiple customers and/or tenants. Some embodiments of the invention may be used to avoid reserving particular resources to particular customers or tenants, for example by allocating resources in response to requests to perform particular tasks and then releasing those resources after the task has been completed.

According to some embodiments of the invention, for each request to perform a particular task, several possible allocation profiles are created or identified, and compared or rated in order to select one profile to be implemented. The profiles may be evaluated or compared for example in terms of efficiency of memory usage and/or efficiency of CPU usage in order to make the selection. Memory usage efficiency measures and CPU usage efficiency measures may be determined in several ways. Examples of how such measures or ratings may be calculated will now be described.

In considering how to allocate cores and memory it is useful to define an optimal allocation ratio "OAR" as the ratio of available memory and cores at a particular time. Consider for example an agent that has just been started. The optimal allocation ratio for the agent at that time can be represented as:

$$OAR^{t0} = \text{Available memory}^{t0}/\text{Available cores}^{t0} \qquad (1)$$

where t0 represents the agent start time at which no allocation or de-allocation events have occurred.

For example if an agent has 8 GB of free memory and 8 free cores then the optimal allocation ratio for that agent is 1 GB/core. If the incoming request ratio matches that of the agent itself then there is no resource wastage when resources are allocated. For example an incoming request for 4 cores at 1 GB/core will consume exactly 4 cores and 4 GB memory, leaving 4 cores and 4 GB memory free.

Figure 4:
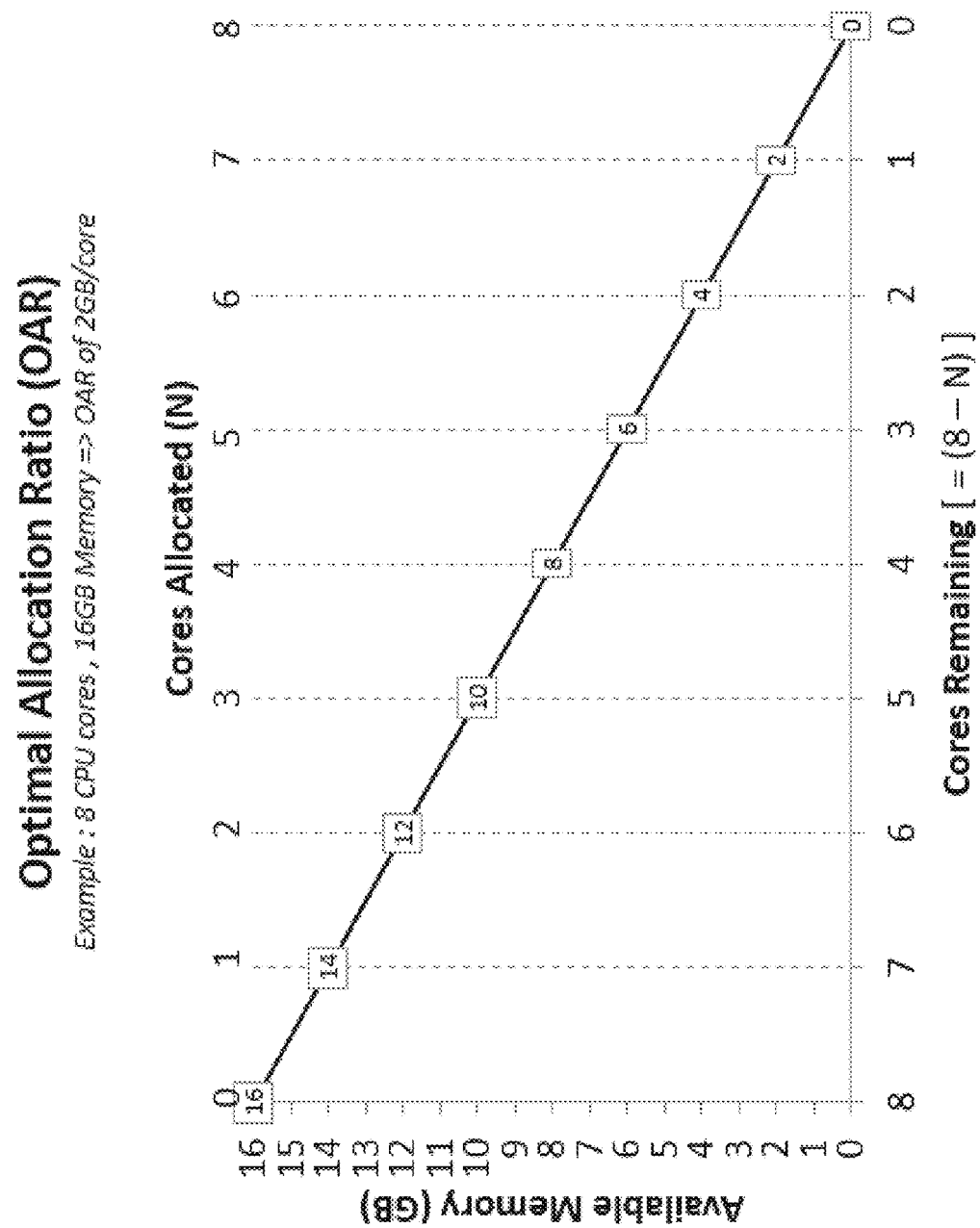
FIG. 4 is a graph showing optimal allocation ratio for an agent with 8 available cores and 16 GB available memory according to some embodiments of the invention.

The OAR can be visualized graphically on a plot of available memory versus available cores as a line from all CPU cores and memory available to zero memory and cores available. FIG. 4 shows an example for an agent with 8 available cores and 16 GB available memory, which equates to an OAR of 2 GB/core. Thus, in order to achieve optimal allocation, the agent would receive a series of requests for 2 GB/core. The OAR determined according to equation 1 is independent of any request.

Figure 7:
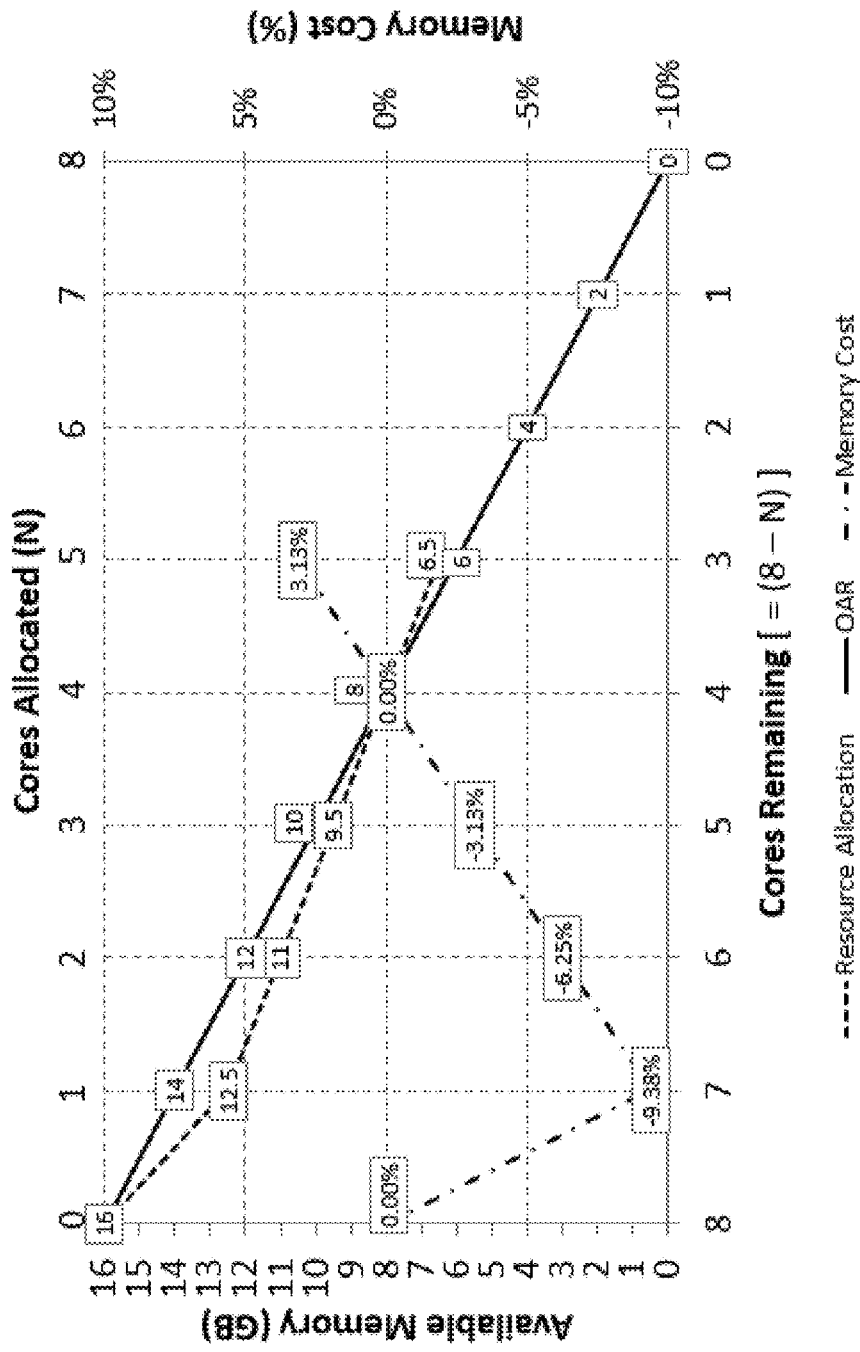
FIG. 7 is a graph similar to FIG. 4 additionally showing allocation of cores and memory in response to a request for 8 cores with 1 GB baseline memory and 1.5 GB per core, according to some embodiments of the invention.

In practice the OAR may vary over time as memory and cores are allocated and hence availability of both is reduced, explained below with reference to FIG. 7. Thus, "available" is used herein to mean "currently available" unless otherwise stated. The OAR at any time may not be a whole number in which case it may not be achievable in practice. Nevertheless it is a useful factor to be considered in choosing an allocation profile.

According to some embodiments of the invention, a memory "cost" may be determined as a memory usage efficiency measure. The memory cost may be determined for example by comparing the amount of memory allocated in a particular allocation profile to the amount of memory corresponding to the OAR for the same number of cores. Thus, memory cost may be inversely proportional to efficiency. The larger the memory cost, the less efficient an allocation profile is considered to be. Memory cost may be positive or negative, depending on whether more than the optimal amount of memory is allocated rendering remaining cores unusable, or more than the optimal amount of cores are allocated rendering remaining memory unusable.

Figure 5:
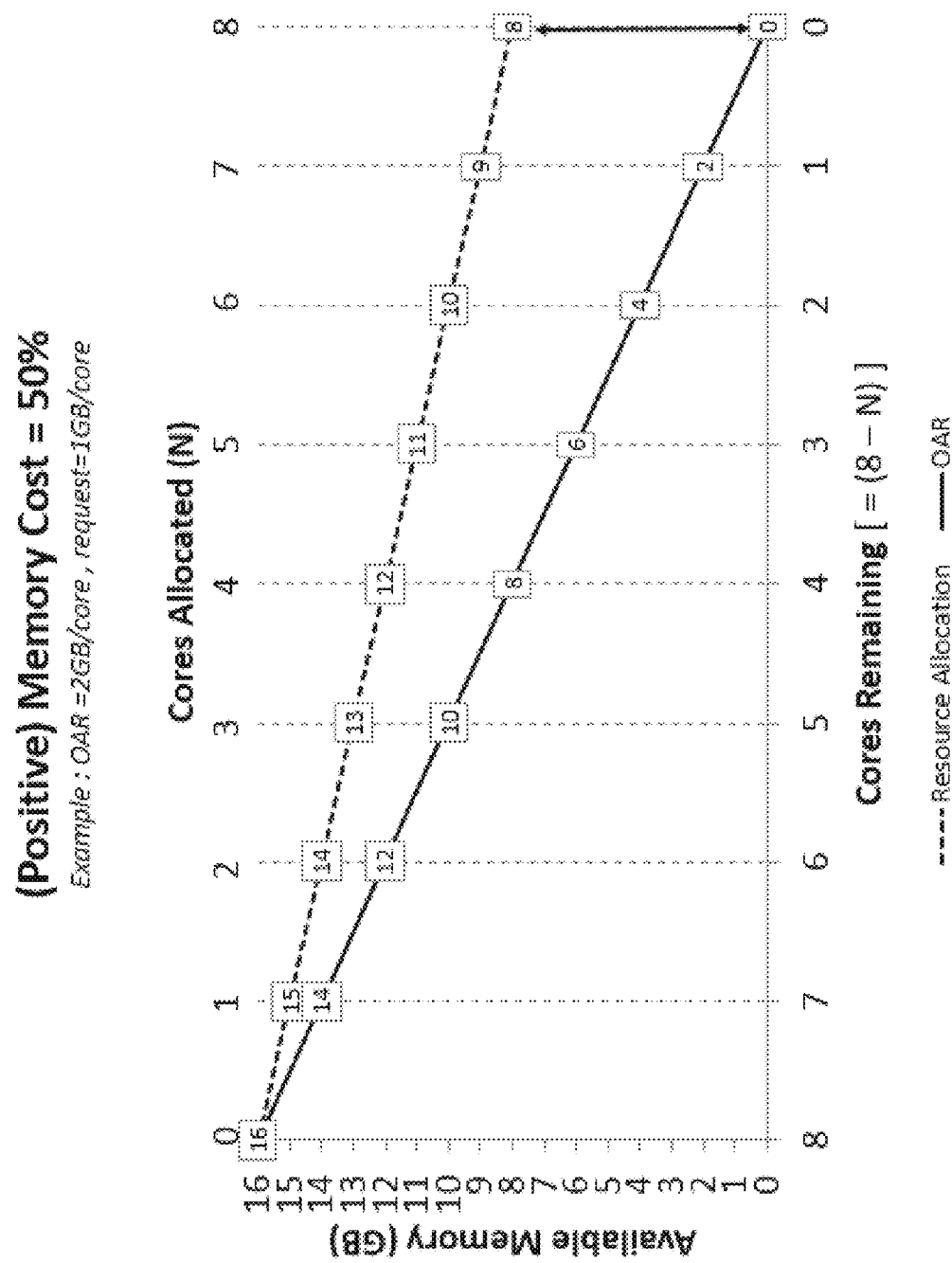
FIG. 5 is a graph similar to FIG. 4 additionally showing allocation of memory at a ratio of 1 GB/core according to some embodiments of the invention.
Figure 6:
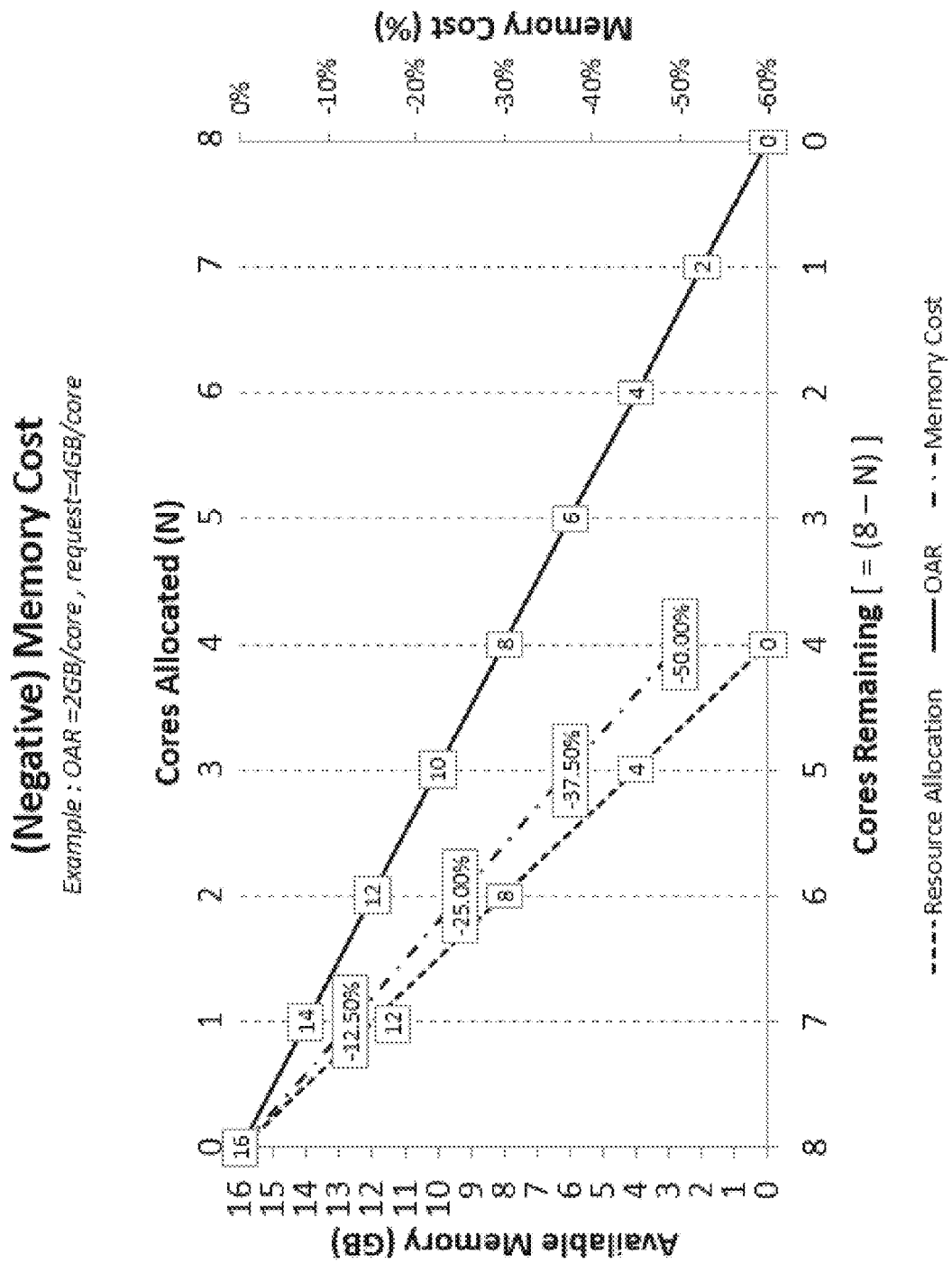
FIG. 6 is a graph similar to FIG. 4 additionally showing allocation of memory at a ratio of 4 GB/core according to some embodiments of the invention.

FIGS. 5 and 6 are graphs showing available memory versus available cores indicating OAR and example requested allocation ratios requiring no baseline memory. In the example of FIG. 5, the agent has 8 cores and 16 GB, i.e. an OAR of 2 GB/core and an incoming request is for 8 cores @1 GB/core, lower than the OAR. If all 8 cores are allocated to this agent then only 8 GB of the 16 GB memory available will have been allocated, and hence the remaining 8 GB are effectively unusable as there are no CPU cores free at the agent to allocate with the memory. In the example of FIG. 6, the agent is the same as in FIG. 5 and the request is for 4 GB/core, higher than the OAR. If all four cores are allocated to this agent then all of the available memory will have been allocated, hence the remaining cores are unusable because there is no memory available.

In the examples of FIGS. 5 and 6 it is also the case that the cores are not optimally allocated since the ratio of the request does not match the OAR. In general an allocation profile may render one or more cores unusable because there is no memory left to serve one or more unallocated cores. According to some embodiments of the invention, a CPU "cost" may be determined as a core usage efficiency measure. For example, if a request defines a core to memory ratio, the core usage efficiency measure may relate to the number of cores remaining with insufficient available memory after all the cores have been allocated according to the core to memory ratio.

According to some embodiments of the invention, both memory usage and CPU usage efficiency measures may be used in the selection of an allocation profile.

Suppose now that the same agent referred to in FIGS. 5 and 6 receives an incoming request for 8 cores with 2 GB baseline memory and 1.5 GB per core. An allocation algorithm may determine that 5 cores of work should be allocated to the agent. This is illustrated in FIG. 7. These resources are no longer available for allocation to a new request. A new OAR can be calculated for the remaining resources, at a time t1 after the first allocation, for example:

$$OAR^{t1} = \text{Available memory}^{t1}/\text{Available cores}^{t1}$$

Figure 8:
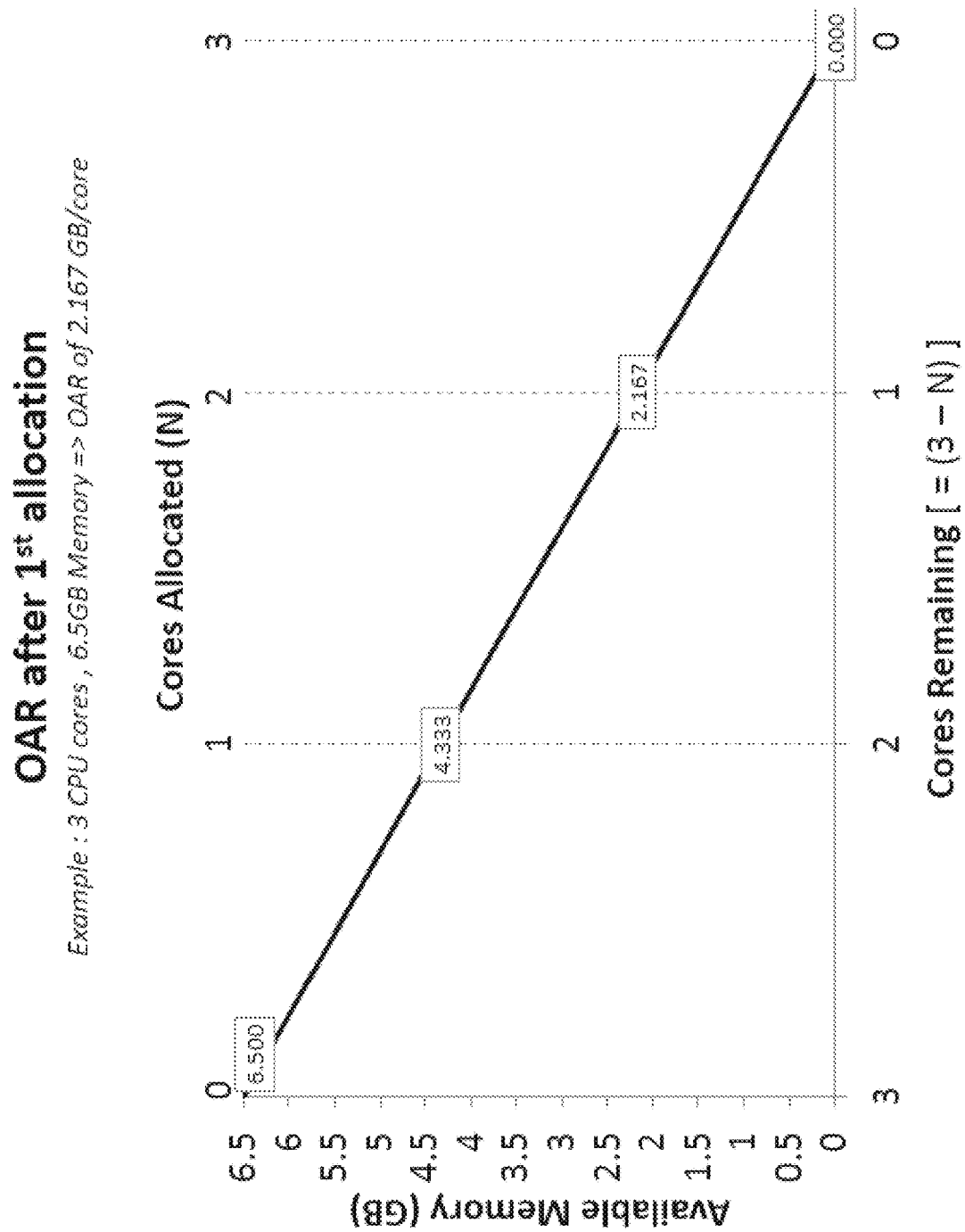
FIG. 8 is a graph showing the new optimal allocation ratio resulting from the allocation shown in FIG. 7, according to some embodiments of the invention.

At $t1$ the agent will have 3 available cores and (16 GB−2 GB−(5*1.5 GB))=6.5 GB available memory. The new OAR for the agent will be 6.5 GB/3=2.1666 GB/core. The new OAR line can now be visualised as shown in FIG. 8.

In a computing system with many calculations in progress then each agent can potentially have its own unique OAR line. Each agent can have several allocations active at any one time, particularly if it is rich in resources. For example a single agent may commence with over 180 GB memory and 48 CPU cores. Such large agents are likely to have many concurrent allocations. The usage of an agent can be described as a series of events in which resources are allocated on commencement of a task or released on completion of a task. In the simple example shown in FIG. 7, the next event could be another allocation for 1 to 3 of the cores remaining, or it could be the cores and memory allocated to a particular task being released back to the agent because the task, e.g. calculations, have been completed. When the next event occurs the OAR may be re-calculated for the time t2.

Memory Cost Calculation

The memory cost for a particular allocation profile may be determined as a measure of the efficiency of the proposed allocation of memory to a specific agent relative to the optimal allocation ratio and the total memory available. FIG. 5 illustrates a scenario where the incoming request is for 8 cores @ 1 GB/core against an agent with 8 cores and 16 GB, i.e. a OAR of 2 GB/core. If all 8 cores are allocated to this agent then only 8 GB of the 16 GB memory available will have been allocated, and hence the remaining 8 GB are unusable as there are no CPU cores free to allocate. The memory allocation cost in this scenario can be determined to be 8/16 or 50%.

The memory cost can be expressed as for example the following formula (as with the other formulas described herein, different formulas may be used in different embodiments):

Memory Cost @ $N$ cores=((Available Memory−Memory Used @ $N$ Cores)−(Available Memory−$N$*OAR))/Available Memory Which simplifies to:

Memory Cost @ $N$ cores=((OAR*$N$)−Memory Used @ $N$ Cores))/Available Memory

Where:

Memory Used @ $N$ Cores=Request Baseline Memory+(Request Memory Per Core*$N$)

Figure 9:
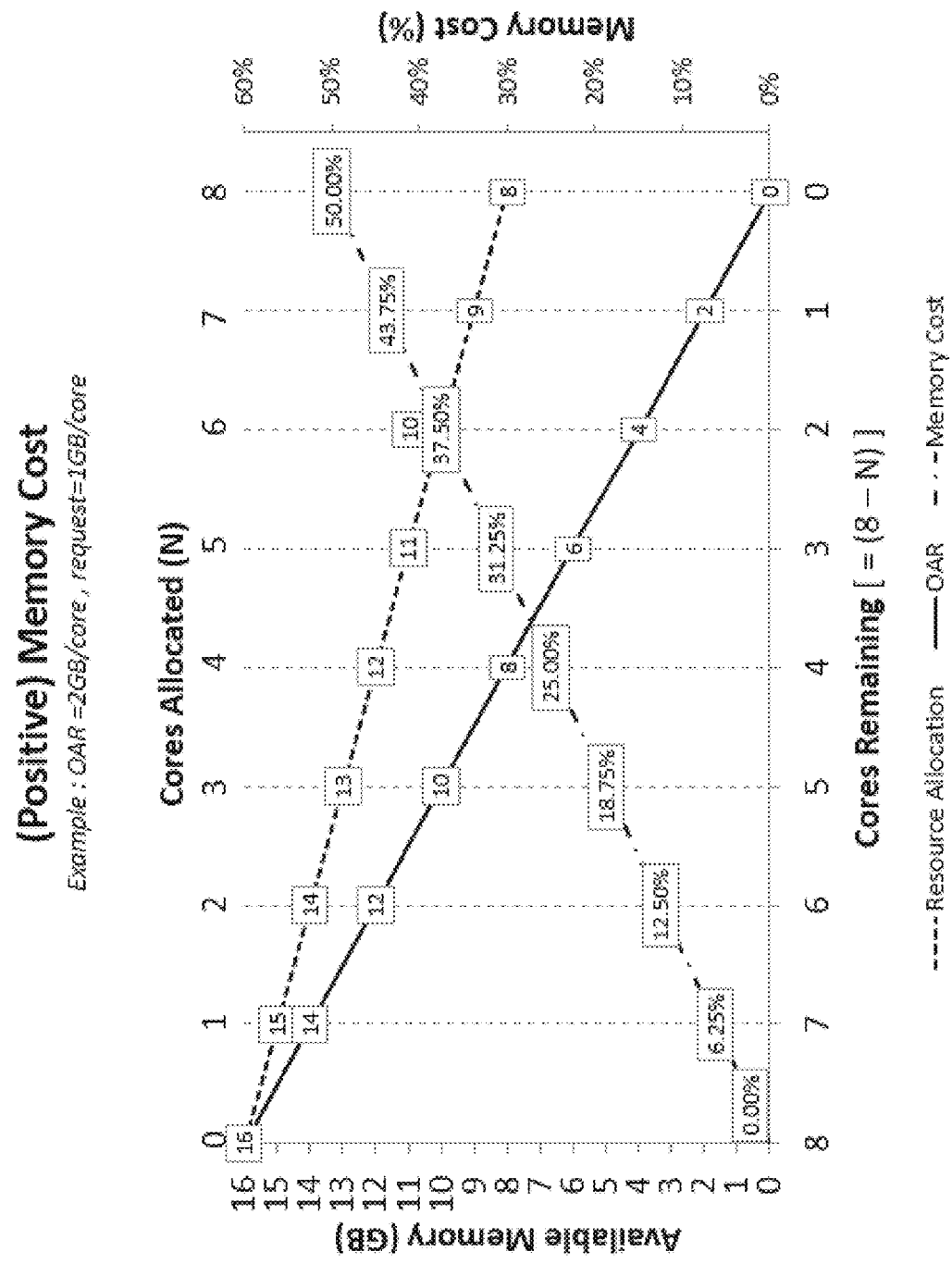
FIG. 9 is a graph similar to FIG. 5 additionally showing variation in "memory cost" with allocation according to some embodiments of the invention.

FIG. 9 is a graph similar to FIG. 5 additionally showing the variation of memory cost as determined according to this formula with allocation of cores and memory. In the example shown in FIG. 9, if only 4 cores are allocated at 1 GB/core then the memory cost can be determined by reading from the graph, or calculated as follows:

OAR for the agent is the Available memory/Available Cores=16 GB/8 cores=2 GB/core.

Memory Used @ 4 cores=0+(4*1 GB)=4 GB

Memory Cost @ 4 cores=((2 GB*4)−(4 GB))/16 GB=(8 GB−4 GB)/16 GB=0.25=25%

Figure 10:
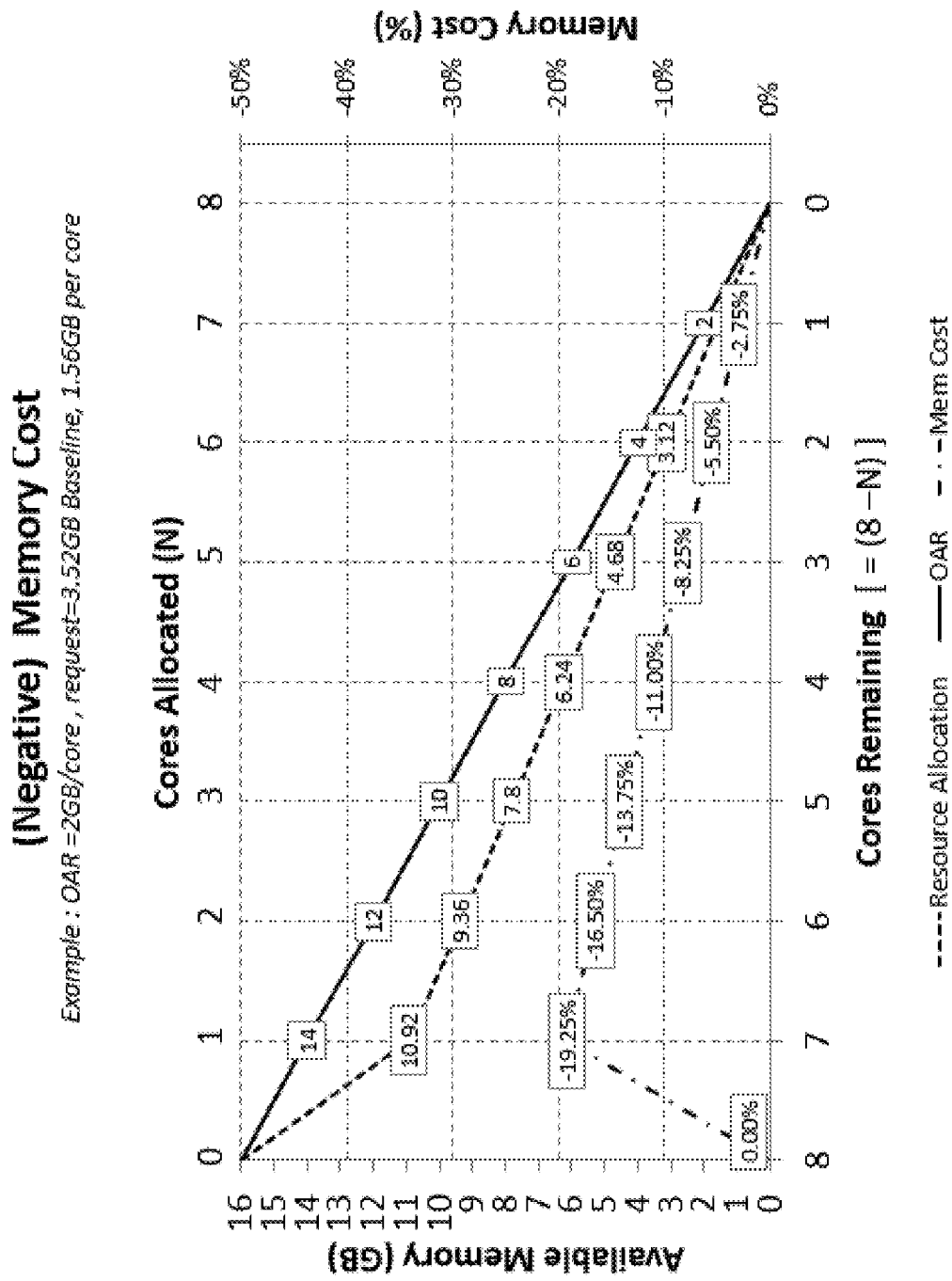
FIG. 10 is a graph showing optimal allocation ratio, allocation in response to a request for 3.52 GB baseline memory and 1.56 GB/core, and associated memory cost; according to some embodiments of the invention.

If a request consumes more resource per core than the OAR then a similar logic may be used to calculate memory cost except that now the cost is negative. FIG. 10 is a graph for the same agent as FIGS. 4-9, with allocation of 3.52 GB baseline and 1.56 GB/core, showing OAR, allocation and calculated memory cost. Viewing the graphs of FIGS. 4-10, any position below the OAR line can be considered to represent a negative memory cost, and any position above the line to represent a positive memory cost.

CPU Cost Calculation

When there is insufficient memory available to allocate the $N^{th}$ core associated with or assigned to an agent after some resources have been allocated, then this core and any additional unallocated available cores on the agent become unusable. For the purpose of determining a CPU usage efficiency measure, it is useful to determine a term "unusable cores" defined as the number of cores that would be rendered unusable if all of the available memory was allocated according to the core to memory ratio specified in the request. For this purpose a core may be deemed unusable if a request for another core with the same core to memory ratio is requested. In practice a core may remain with only a lesser amount of memory. Thus according to some embodiments of the invention the calculation of a CPU usage efficiency measure comprises determining the number of CPU cores remaining after all cores have been allocated according to the core to memory ratio specified in the request. This may be regardless of the number of cores specified in the request. In other words, the number of cores allocated to determine the number of unusable cores may be larger than the number of cores specified in the request.

The CPU cost may be calculated as follows:

CPU Cost @ N cores=(N/(Available Cores−Unusable Cores))*(Unusable Cores/Available Cores)

Figure 11A:
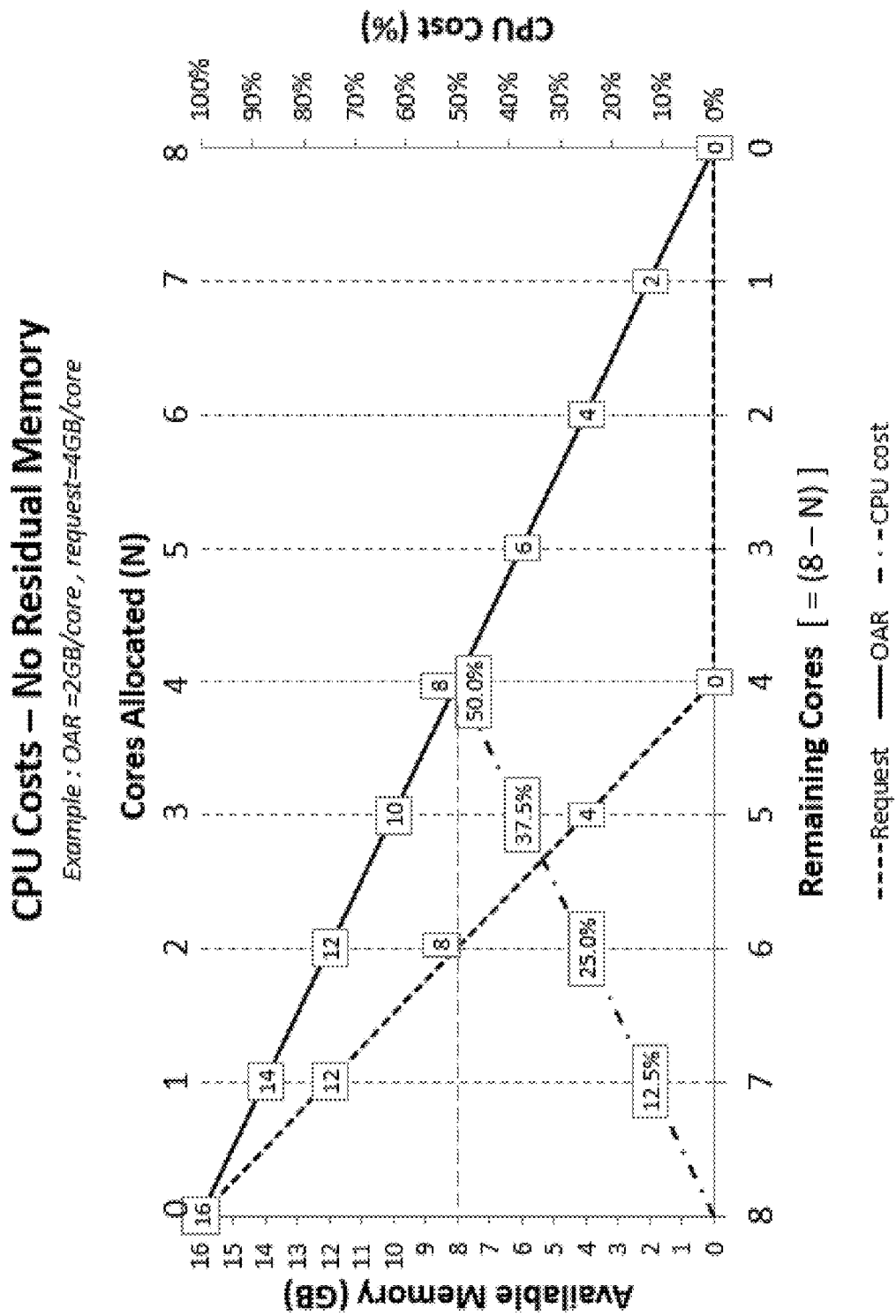
FIGS. 11A and 11B are graphs showing optimal allocation ratio, allocation in response to a request for 4 GB/core and 2.5 GB/core respectively, and associated "CPU cost"
Figure 11B:
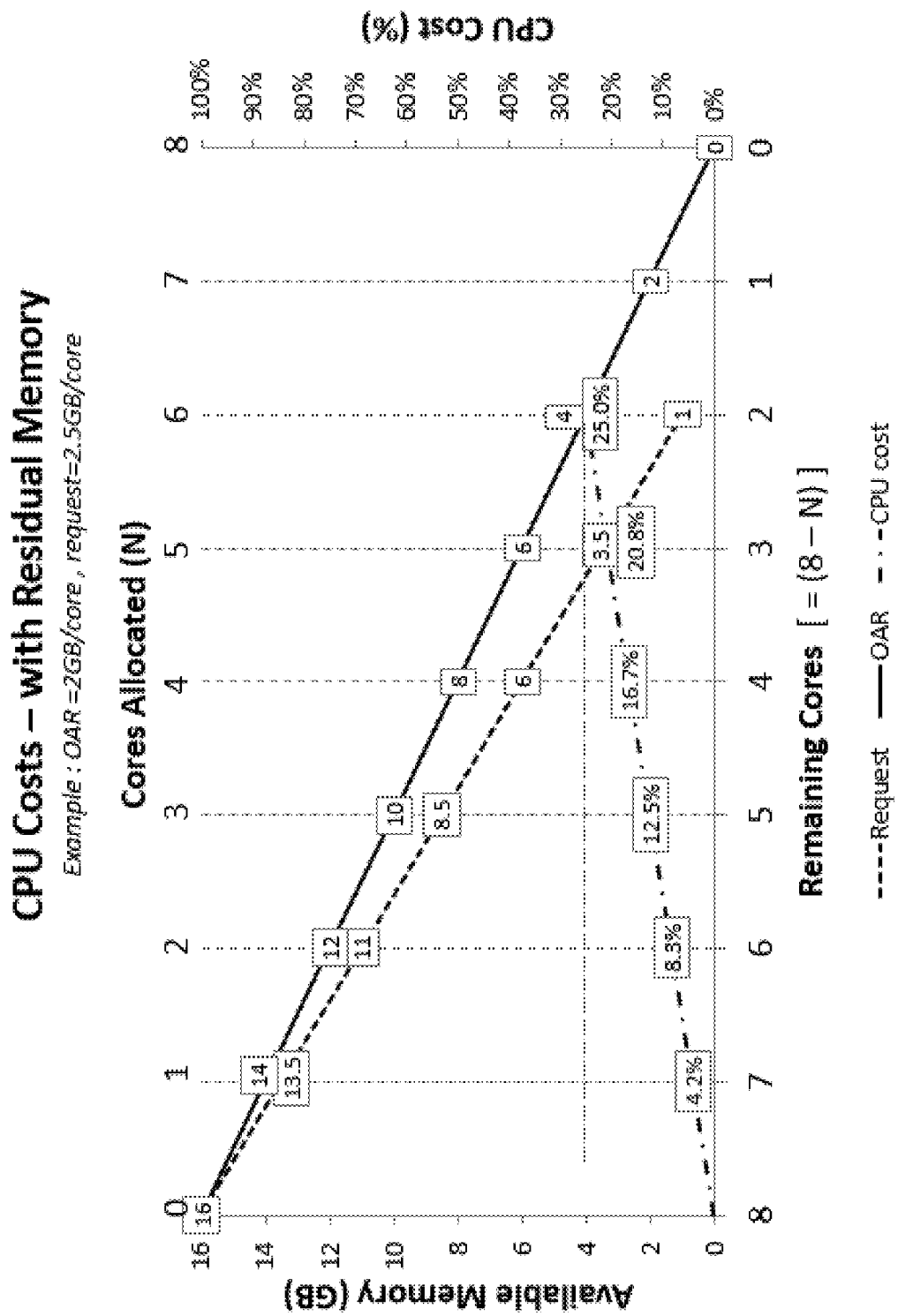

FIGS. 11A and 11B show examples of variation of CPU cost determined according to this formula, with allocation of cores to a task. As shown in FIG. 11A:

CPU Cost @ 2 cores=2/(8−4)*(4/8)=0.25=25%

CPU Cost @ 4 cores=4/(8−4)*(4/8)=0.50=50%

In the example above 50% of the available CPU resources become unusable when the 4th core is allocated as there is no memory available. This is the (Unusable Cores/Available Cores) term in the equation. In physical terms no cores become unusable until the 4th CPU is allocated. The first term of the formula takes the proximity to the last possible allocation into account. In the above example if 2 cores are allocated then that would be halfway to rendering 4 cores unusable, and hence the CPU cost may be calculated as half the total cost at 4 cores.

In the example of FIG. 11B, a request for 2.5 GB/core is being fulfilled in an agent with 8 cores and 16 GB memory. Here the number of unusable cores is 2, because when 2.5×6=15 GB memory has been allocated, only one GB memory is left which is not sufficient to satisfy a further request for 2.5 GB/core. Thus at the point when the request line reaches 2 cores remaining, no further discreet cores can be allocated. The formula for core cost may not permit partial CPU allocations.

Total Allocation Cost (for a Specific Agent)

A total allocation cost for a specific agent for a specific allocation profile may be determined as the sum of the CPU cost and the absolute value of the memory cost (for example in computing languages like VBA and Java). Mathematically this equates to the modulus of the memory cost. Explicitly, if the CPU Cost is 25% and the memory cost is −25% (e.g. over allocation), then the total allocation cost would be 50% and not 0%. According to some embodiments of the invention, a total allocation cost may be determined as a weighted sum of resource usage efficiency measures, and according to some embodiments of the invention other factors may additionally be considered in selecting an allocation profile.

Allocation of Resources

Some embodiments of the present invention use an allocation algorithm to select an allocation profile based on the cost of the profile, for example as determined from the total of the memory cost and the CPU cost. If a computing system consisted of only a single agent with available resources then the allocation decision would be a simple one, i.e. either there is sufficient resource to satisfy all/part of a request to perform a task, or there is not. However, once there is more than one agent available then there will be more than one possible allocation profile. To illustrate if there are two agents A and B with 4 cores each then the possible allocation profiles for an incoming request for 4 cores would be:

| | |
|---|---|
| A4 | allocate 4 cores to Agent A and 0 to Agent B |
| A3, B1 | allocate 3 cores to Agent A and 1 to Agent B |
| A2, B2 | allocate 2 cores to Agent A and 2 to Agent B |
| A1, B3 | allocate 1 cores to Agent A and 3 to Agent B |
| B4 | allocate 0 cores to Agent A and 4 to Agent B |

Some embodiments of the invention may be used to select an allocation profile, for example according to which profile is determined to be the most efficient. The efficiency of one profile or another may be determined from the respective efficiency measures for memory usage and CPU usage, for example as indicated by one or both of the memory cost and the CPU cost. Some embodiments of the invention may include for each allocation profile, calculating the total of the calculated efficiency measures for CPU and memory usage across all of said agents, and selecting an allocation profile determined from said total to have the maximum efficiency. For example, according to some embodiments of the invention, an allocation profile may be selected which has the lowest total allocation cost across all agents. This total for memory cost and CPU cost across all agents may be referred to as an efficiency score. When efficiency is determined in this way, the higher the score the lower is the efficiency. A worked example is illustrated in table 1 below in which the computing system is represented as a so-called calculation grid, indicating the number of agents and the cores and memory available at each agent. The request specifies an amount of memory per thread, where each thread corresponds to a core, and may include, in addition, an identification of or details of a task to be performed.

TABLE 1

Example 1-score calculation for two agents

| Request | | Calculation Grid | | |
|---|---|---|---|---|
| Cores | 4 | Agent | Cores | Memory (Mb) |
| MemBase (Mb) | 1024 | A | 4 | 4096 |
| MemPerThread (Mb) | 1024 | B | 4 | 5120 |

| Allocation profile | Score | CPU total | +ve MEM | −ve MEM | CPU costs % A | CPU costs % B | Memory costs % A | Memory costs % B |
|---|---|---|---|---|---|---|---|---|
| B4    | 0.0000 | 0.0000 | 0.0000 | 0.0000 | 0.0  | 0.0 | 0.0   | 0.0   |
| A1 B3 | 0.3833 | 0.0833 | 0.0000 | 0.3000 | 8.3  | 0.0 | −25.0 | −5.0  |
| A2 B2 | 0.5167 | 0.1667 | 0.0000 | 0.3500 | 16.7 | 0.0 | −25.0 | −10.0 |
| A3 B1 | 0.6500 | 0.2500 | 0.0000 | 0.4000 | 25.0 | 0.0 | −25.0 | −15.0 |

In the example of table 1, the profile A4 is not possible as the allocation of 4 cores requires (4*1024)+1024=5120 MB to fulfill and agent A only has 4096 MB available. As can be seen in this case the request matches the OAR line of Agent B and hence all 4 cores can be satisfied without incurring any CPU or memory costs. Any allocation to Agent A will incur the additional cost of the baseline memory, in this case 1024 MB and hence a negative memory cost of −25% (i.e. −1024 MB/4096 MB).

For some scenarios there may be more than one possible allocation profile determined to have the maximum efficiency, for example more than one profile having the lowest score value. In these cases one or more tie-breakers may be used to select an allocation profile. For example, allocation profiles may be compared in terms of availability of resources after allocation according to the profile in order to select one or another. An allocation profile may be selected in favor of another because it leaves the grid with the most homogeneous resources available across all agents, for example measured in terms of OAR values across all agents. One way to implement this is to calculate the post-allocation OAR for each agent, and then to examine the distribution of all the non-zero post-allocation OAR values, for example by calculating the standard deviation of the post-allocation OAR values. The allocation profile with the most evenly distributed OAR values may be chosen. Standard deviation is a well-known statistical measure for the variation in a set of values, and so the profile with the lowest standard deviation may be selected. Thus standard deviation may be used to control the variance within the grid. Or to put it another way this example of a tie-break prefers homogeneity over heterogeneity.

If this tie breaker does not produce a clear winner, then a second tie-breaker may be applied according to which the profile with the maximum amount of total available remaining memory across all agents may be chosen. These two tie breakers may according to some embodiments of the invention be applied in the reverse order. The second tie breaker may operate on all profiles determined to have the maximum efficiency or a selection of profiles having equal ranking according to the first tie breaker.

If no tie-breakers produce a clear winner, any profile determined to have the maximum efficiency may be chosen, or any profile determined to have the same OAR distribution and/or remaining memory.

Figure 12A:
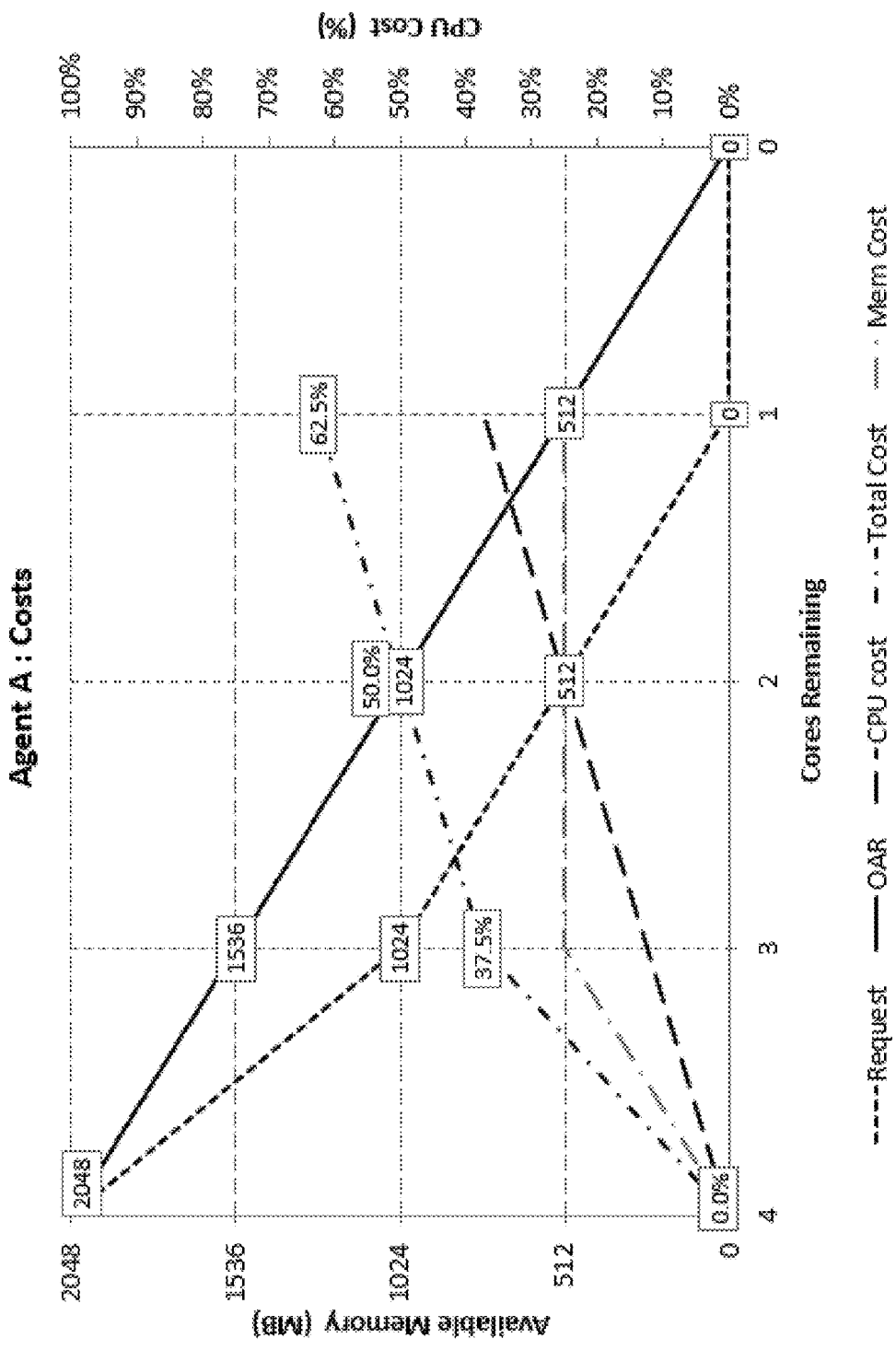
FIGS. 12A, 12B, 12C are graphs showing optimal allocation ratio, allocation and associated costs for three different agents according to some embodiments of the invention.
Figure 12B:
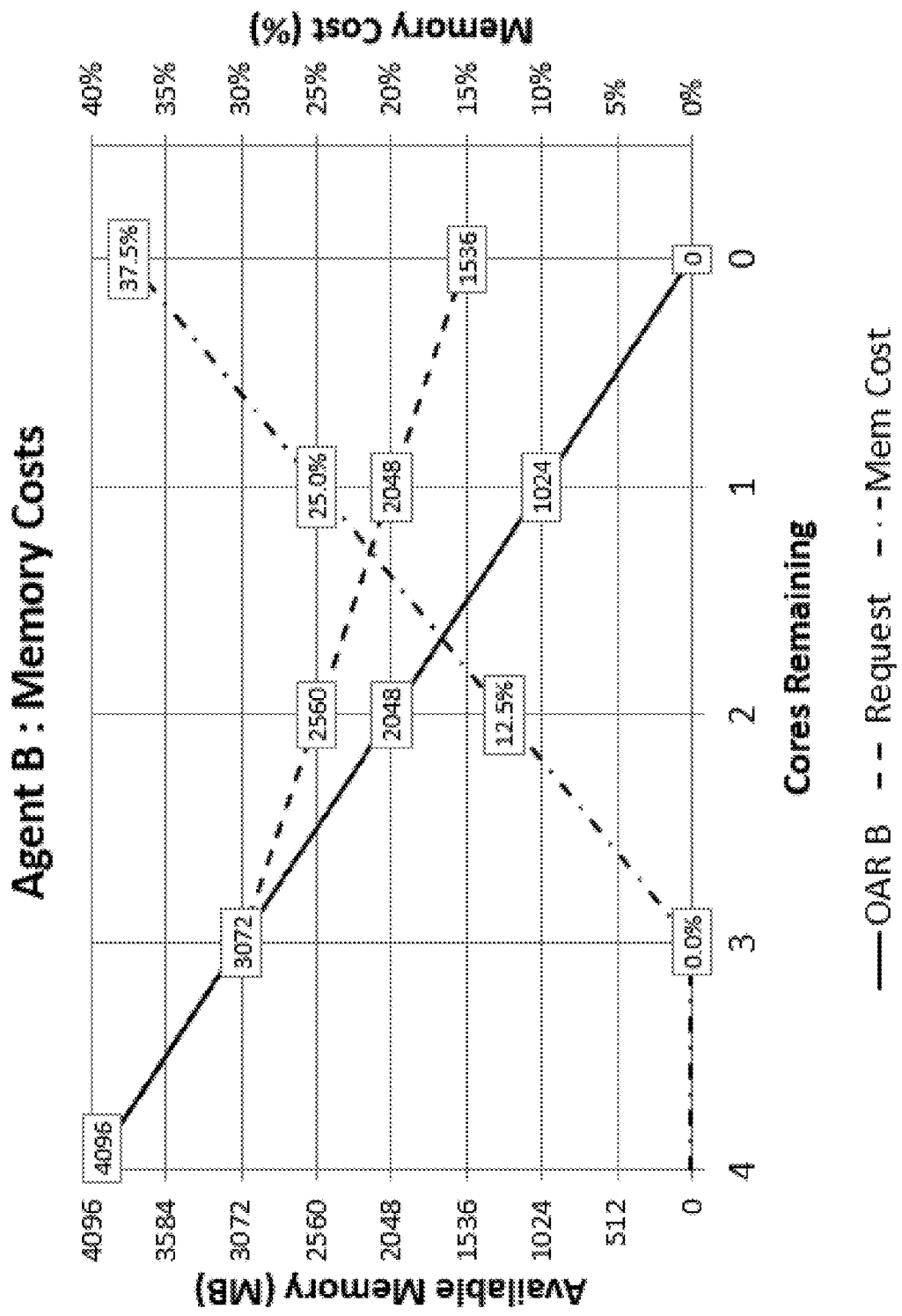
Figure 12C:
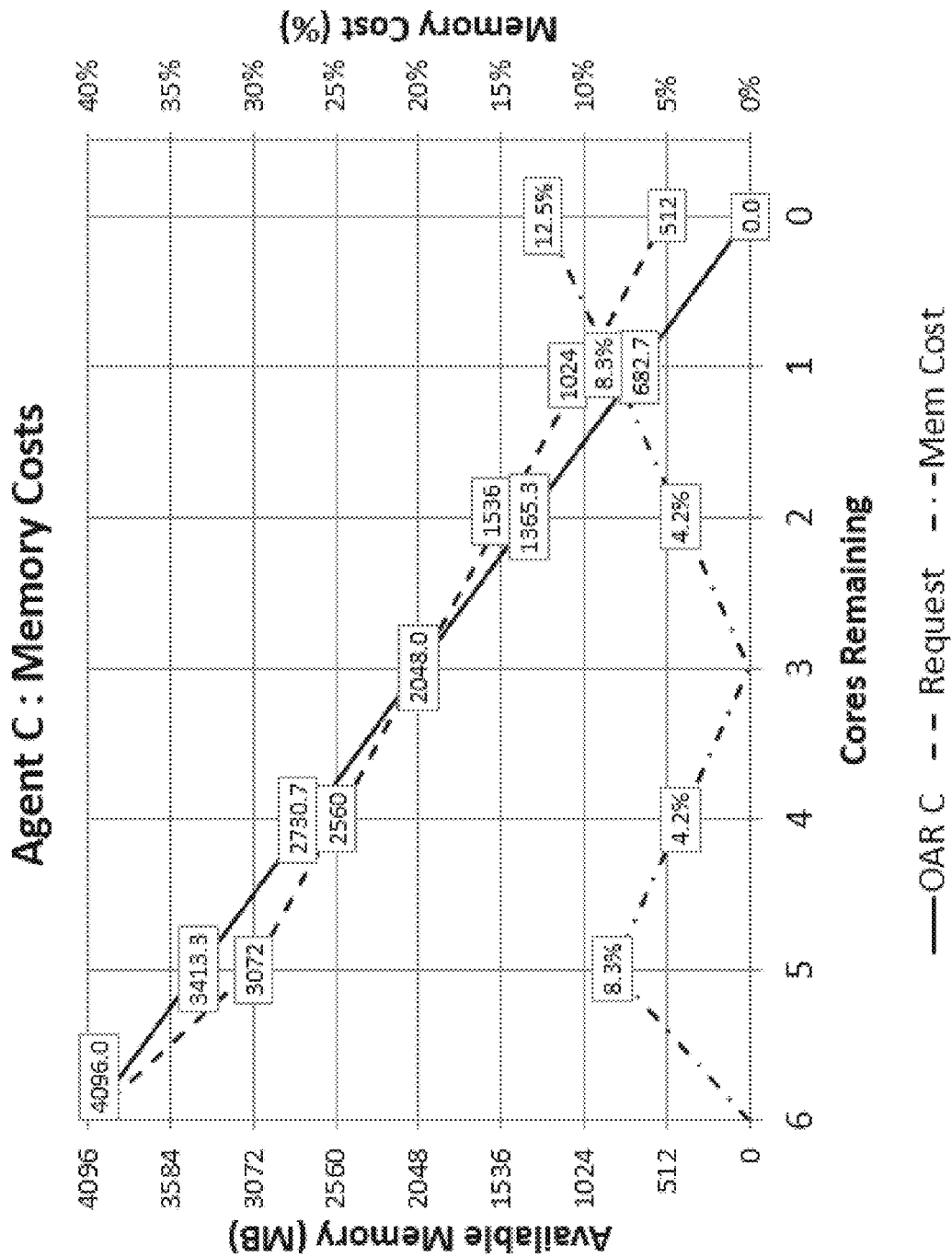

Another worked example is shown in FIG. 19 which shows an example of score calculation for three agents all having different OAR values. FIGS. 12A, 12B, 12C are graphs showing optimal allocation ratio, allocation and associated costs for three different agents using the example of FIG. 19. For Agent A in FIG. 12A the total cost, or score, is plotted in addition to unsigned, or absolute, memory cost. FIG. 19 and FIGS. 12A, 12B, 12C show that the allocation of the first core to Agent A has a total cost, or score, of 37.5%, which is greater than equal to all the costs of any allocations to Agents B and C. Hence an algorithm which selects based on lowest score will allocate to Agents B or C in preference to Agent A.

Agents B and C have sufficient memory to avoid any CPU costs and hence the best profile may be determined by the memory costs alone. FIGS. 12B and 12C plot the available resources against the unsigned memory cost for Agents B and C.

The first allocation to Agent B is zero cost as the request is on the OAR line, as shown in FIG. 12B. Subsequent allocations incur a memory cost of 12.5% per core. Based on total cost or score, the algorithm may determine that 4 cores should be allocated to C and 1 to B, a cost of 4.2%+0.0%. If all 5 cores were allocated to C and none to B then the cost would be 8.3%, which is higher. Allocating a second core to B incurs a cost of 12.5% which is even higher.

It is possible for tasks such as calculation processes to be implemented with a fixed baseline memory requirement, e.g. for holding shared data accessible to all calculation threads, and little or no requirement for thread-level memory, for example no memory/core requirement. The example shown in FIG. 20 and illustrated by the graph of FIG. 13 shows that allocation of resources according to embodiments of the invention is appropriate even when there is no memory/core requirement for a task.

Figure 13:
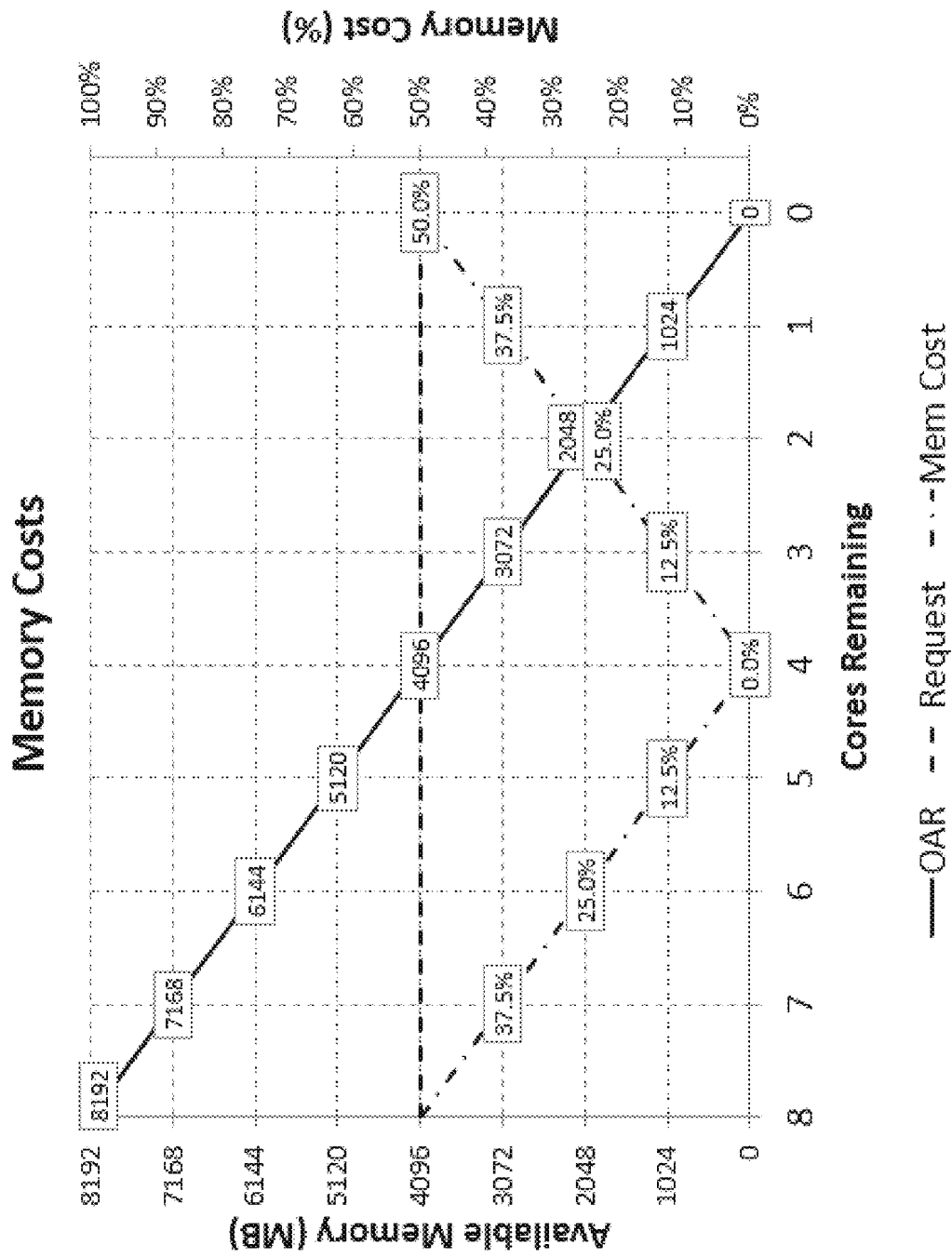
FIG. 13 is a graph showing optimal allocation ratio, allocation and associated memory cost for a request requiring only baseline memory according to some embodiments of the invention.

FIG. 13 shows an example where the request is for 16 cores and 4096 Mb baseline memory to a computing grid including four agents each having 8 cores and 8192 Mb memory. Only one graph is needed to show the relationship between allocation and memory cost since all agents are the same in this example.

The chart of FIG. 13 indicates that the most efficient allocation according to the score is for 4 cores as that has no cost impact on the grid. So for a request for 16 cores the best allocation would be A4 B4 C4 D4 as all four allocations incur no costs. If 4 cores are allocated to two agents and 3 to one of them and 5 to the other, then the agents with 3 and 5 cores incur a negative memory cost of −12.5% and a positive memory cost of +12.5% respectively, which adds up to a 25% net cost—hence the score of 0.25.

Using the same agent grid as for example 3 but changing the request from 16 to 20 cores then there are many allocation profiles that have the same score. As all the agents are identical then all allocation profiles that have the same combination of cores are effectively the same, e.g. A5 B6 C6 D7 is the same as A7 B6 C6 D5, and the same as A6 B6 C7 D5 etc. According to some embodiments, additional calculations may be performed to make a selection between these.

Any allocations with core counts of 5, 6, 6, 7 are the same and can be considered to have a profile of 5-6-6-7. The same applies to any other combination of cores that adds up to 20. FIG. 21 shows the profiles determined by an allocation algorithm according to some embodiments of the invention to have the lowest scores. As there are no CPU costs in any of the scenarios these are not shown.

FIG. 21 shows post-allocation OARs remaining after implementation of each possible allocation. In the example scenario of FIG. 21 and FIG. 13, any agent that has an allocation of 4 cores will incur no costs and hence the post-allocation OAR will be the same as the OAR prior to the allocation. In addition any agent that has been allocated 8 cores will have an OAR value of zero. In the example, Agent D has all eight cores allocated and therefore it has no more resources to offer and may therefore be excluded from standard deviation calculation.

In FIG. 21 the top five profiles all have the same score of 0.5. However, at least some of the profiles may have different sets of post-allocation OARs. The STD Dev column shows the standard deviation of the agents with a non-zero value, for example in the first line the standard deviation across agents A, B and C. The standard deviation is an indication of the homogeneity of the remaining resources. In the example of FIG. 21, the smaller the standard deviation the more homogeneous the remaining resources. In FIG. 21 the first two profiles have a standard deviation of zero as the non-zero post allocation OAR values for all the available agents in the grid are the same as each other. Therefore, since the agents are the same, any combination of 4-4-4-8 or the one 5-5-5-5 profile may be deemed equal in terms of post-allocation homogeneity. They are equivalent because in the 5-5-5-5 case each allocation is 12.5% away from the OAR line, giving a total of 4×12.5%=50%, and in the 4-4-4-8 case the 4 core allocations incur no costs, but the 8 core allocation incurs a memory cost of 50%.

According to some embodiments of the invention, a choice of allocation profile may be made randomly between those for which the efficiency is calculated to be the same, e.g. best (lowest score in the described examples) and for which the distribution of post allocation OARs is equal minimum. According to other embodiments of the invention an additional tie breaker may be used, such as total remaining memory.

Example System Architecture

Methods and systems according to some embodiments of the invention may be used in the allocation of resources for tasks of different kinds. Thus, different allocation processes for different kinds of tasks may not be required.

Figure 14:
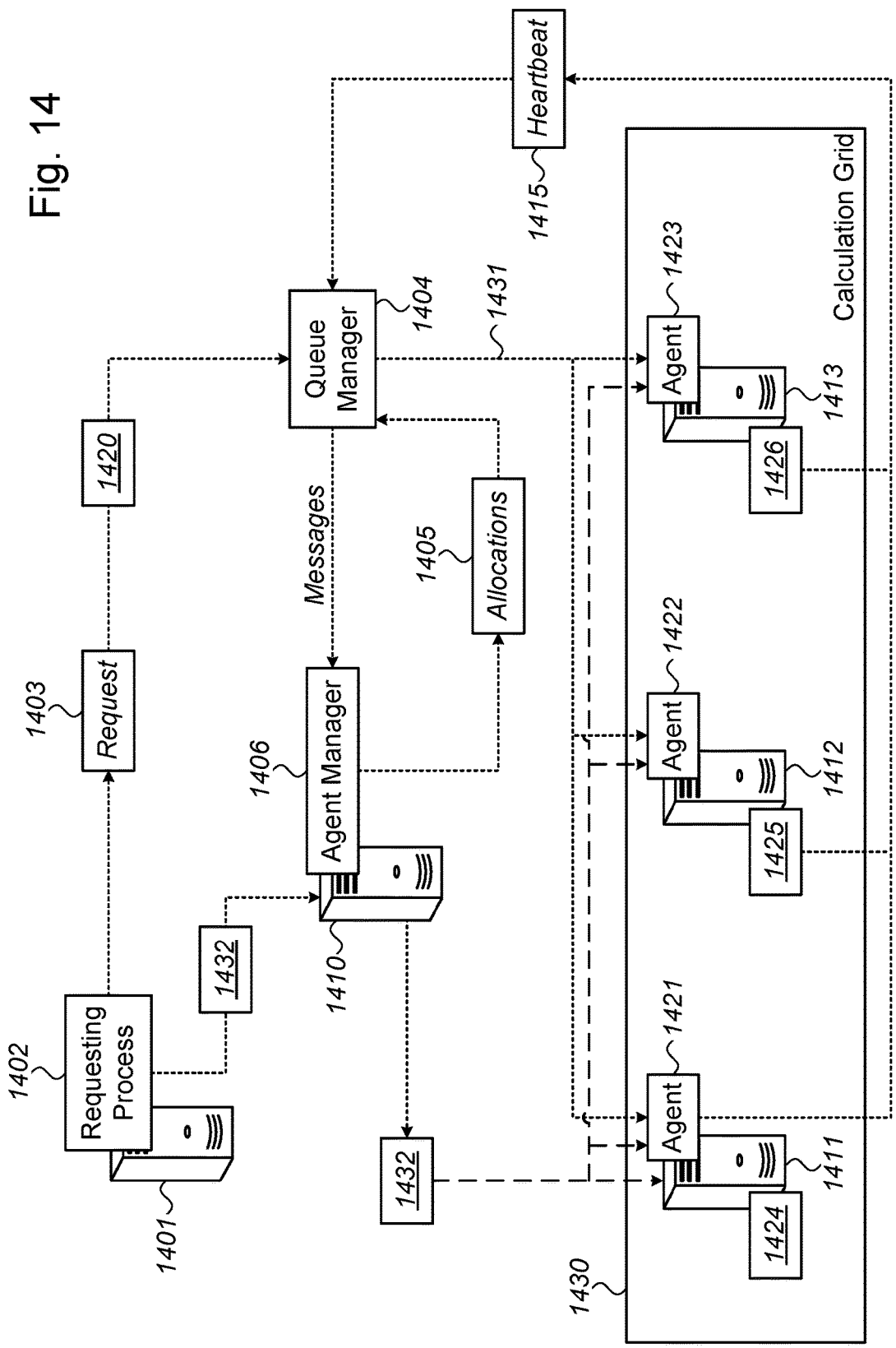
FIG. 14 is a diagram of a computing system architecture according to some embodiments of the invention.

The architecture shown in FIG. 14 includes a number of computers each of which may include one or more processors and memory configured, e.g. programmed, e.g. using one or more algorithms, to perform one or more operations or processes. Each of the computers shown in FIG. 14 may include or be for example a computing system as shown in FIG. 15. Each of the computers shown in FIG. 14 may represent physical or virtual resources. In FIG. 14 computer 1401 may produce request messages for resources for a task provided by other computers shown in FIG. 14, such as a calculation service. Any of the computers shown in FIG. 14 may be configured as servers. For some kinds of task, e.g. kinds of calculation, such as the calculation of payable commission in a sales environment, memory requirements may be static and therefore only a single request message may be processed by a single call to an allocation process or algorithm, which may operate on the same or a different computer or server. For other kinds of task such as crediting calculations, where for example data relating to a transaction may be matched to a person to be remunerated, the workload may be already split across multiple partitions each with their own memory requirements, in which case an allocation process may be repeated for each partition request until all requests for that particular task are satisfied or the resources are exhausted. The computers shown in FIG. 14 may communicate with each other via any suitable network including but not limited to wired and wireless networks, internet, local area networks and wide area networks. In the illustrated embodiment, computer 1401 may communicate with managers and agents via the internet 1420 and other computers may communicate with each other via local networks indicated in dotted lines, such as network 1431.

In FIG. 14, computer 1401 may implement a requesting process indicated by block 1402 and generate requests 1403 for resources to perform a task. Each request 1403 may specify a number of CPU cores and amount of memory for performing the task, for example in extended mark-up XML language, although other languages may be used. The architecture of FIG. 14 additionally includes computer 1410 configured as agent manager, e.g. operating an agent manager algorithm 1406, and one or more further computers operating agents. The illustrated architecture shows computers 1411, 1412, 1413, operating respective agents 1421, 1422, 1423 in a calculation grid 1430, each of which is associated with or assigned to a predetermined number of cores and a predetermined amount of memory. Each of agents 1421, 1422 and 1423 may be an agent as described with reference to FIG. 1 and may be for example a Java Mule application. Requests 1403 may be sent to a queue which may be stored in a manner known in the art, for example using a known proprietary queue manager indicated at 1404 which may be implemented on any of the computers shown in FIG. 14, such as computer 1410.

The agents 1421, 1422, 1423 may report their status to the queue manager 1404, for example via the local network 1431, for example in the form of heartbeat messages indicated as 1415, which may include the allocation status of an agent, for example a report on the amount of memory and cores the agent has available for a new task. These status messages are received by the queue manager 1404 and used to manage the sending of requests to perform new tasks. Thus the queue manager 1404 may receive requests and forward them to the agent manager 1406 according to availability of resources at the agents 1421, 1422, 1423. The queue manager 1404 may pass requests and agent allocation state messages to the agent manager 1406 which may consume requests and in response output a selected allocation profile 1405, for example one profile per request e.g. in the form of an XML message, according to some embodiments of the invention. Thus a method according to some embodiments of the invention may be implemented at the agent manager 1406. The agent manager 1406 may communicate the selected allocation profile to agents identified in the selected allocation profile, for example via the queue manager 1404.

The agent manager 1406 may respond to requests with one or more allocation messages which are relayed to the respective agents 1421, 1422, 1423 by the queue manager 1404. The agents 1421, 1422, 1423 may process the messages received from the queue manager 1404 and deploy the allocated resources to run the relevant distribution for the specified worker type (e.g. Crediting or Calculation). Regular heartbeat messages 1415, for example in the form of XML messages, are sent from each agent to the agent manager 1406 via the queue manager 1404. Once a task has been completed, e.g. a worker has finished processing, the agent may release the allocation and may notify this to the queue manager, for example via the heartbeat messages.

According to some embodiments of the invention, an allocation algorithm implemented at the agent manager 1406 may be independent from the deployment of an algorithm, e.g. a worker, for performing the task itself. A requesting system, for example computer 1401, may provide deployable worker artifacts 1432, e.g. software, required to fulfill its resource request messages 1403. A deployable worker artifact may consist of a set of distribution files or distribution objects. These may be stored at the requesting computer 1401. The deployable worker artifacts 1432 may be transmitted from the requesting computer 1401 to the agent manager 1406, and the agent manager 1406 may forward them to each agent 1421, 1422, 1423 of which resources are allocated for a task, in parallel with the transmission of allocation messages from the queue manager 1404 to the agents. Each resource request message 1403 may specify a worker type and version properties.

Each task deployment may be transient in nature, for example it may be active only for the duration of the allocation and not used again once the current work or task is complete. Thus the correct version of the task software may always be used even if different tenants use different versions of the task software. In FIG. 14, each computer 1411, 1412, 1413 is also shown to be operating a respective transient worker deployment 1424, 1425, 1426, shown in dotted lines to indicate that this is a transient deployment and not, for example, software that permanently resides at any of the computers in the calculation grid 1430.

Reference is made to FIG. 15, showing a block diagram of an exemplary computing device according to embodiments of the present invention. Computing device 1500 may include a controller 1505 that may include, for example, one or more a CPU cores, a chip or any suitable computing or computational device, an operating system 1515, a memory 1520, a storage 1530, input devices 1535 and output devices 1540. Thus, one or more CPU cores in controller 1505 and part of memory 1520 may be associated with or allocated to an agent according to some embodiments of the invention and may be allocated to the performance of a task according to some embodiments of the invention.

Operating system 1515 may be or may include any code segment designed and/or configured to perform tasks involving coordination, scheduling, arbitration, supervising, controlling or otherwise managing operation of computing device 1500, for example, scheduling execution of programs. Operating system 1515 may be a commercial operating system. Memory 1520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1520 may be or may include a plurality of, possibly different memory units.

Executable code 1525 may be any executable code, e.g., an application, a program, a process, task or script. Executable code 1525 may be executed by controller 1505 possibly under control of operating system 1515. For example, executable code 1525 may be an application implementing allocation of resources according to some embodiments of the invention. Controller 1505 may be configured to carry out embodiments disclosed herein by for example executing code or software. Where applicable, executable code 1525 may carry out operations described herein in real-time. Computing device 1500 and executable code 1525 may be configured to update, process and/or act upon information at the same rate the information, or a relevant event, are received. In some embodiments, more than one computing device 1500 may be used. For example, a plurality of computing devices that include components similar to those included in computing device 1500 may be connected to a network and used as a system. For example, allocation of resources according to some embodiments of the invention may be performed in real time by executable code 1525 when executed on one or more computing devices such computing device 1500.

Storage 1530 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 1530 and may be loaded from storage 1530 into memory 1520 where it may be processed by controller 1505. In some embodiments, some of the components shown in FIG. 15 may be omitted. For example, memory 1520 may be a non-volatile memory having the storage capacity of storage 1530. Accordingly, although shown as a separate component, storage 1530 may be embedded or included in memory 1520.

All or part of memory 1520 and storage 1530 may be allocated or assigned to an agent according to some embodiments of the invention, and may therefore be allocated to the performance of a task according to some embodiments of the invention.

Input devices 1535 may be or may include a mouse, a keyboard, a touch screen or pad or any suitable input device. It will be recognized that any suitable number of input devices may be operatively connected to computing device 1500 as shown by block 1535. Output devices 1540 may include one or more displays, speakers and/or any other suitable output devices. It will be recognized that any suitable number of output devices may be operatively connected to computing device 1500 as shown by block 1540. Any applicable input/output (I/O) devices may be connected to computing device 1500 as shown by blocks 1535 and 1540. For example, a wired or wireless network interface card (NIC), a modem, printer or facsimile machine, a universal serial bus (USB) device or external hard drive may be included in input devices 1535 and/or output devices 1540.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 1520, computer-executable instructions such as executable code 1525 and a controller such as controller 1505.

Figure 16:
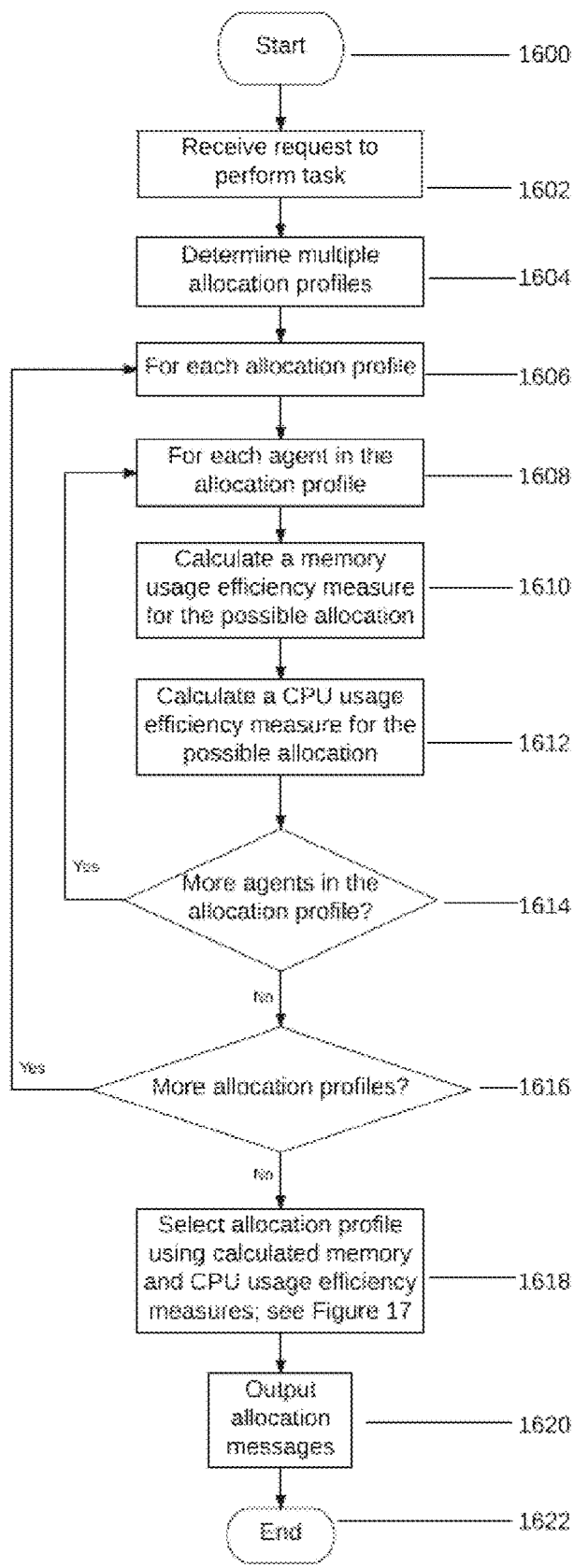
FIG. 16 is a flow chart showing a method of resource allocation according to some embodiments of the invention.
Figure 17:
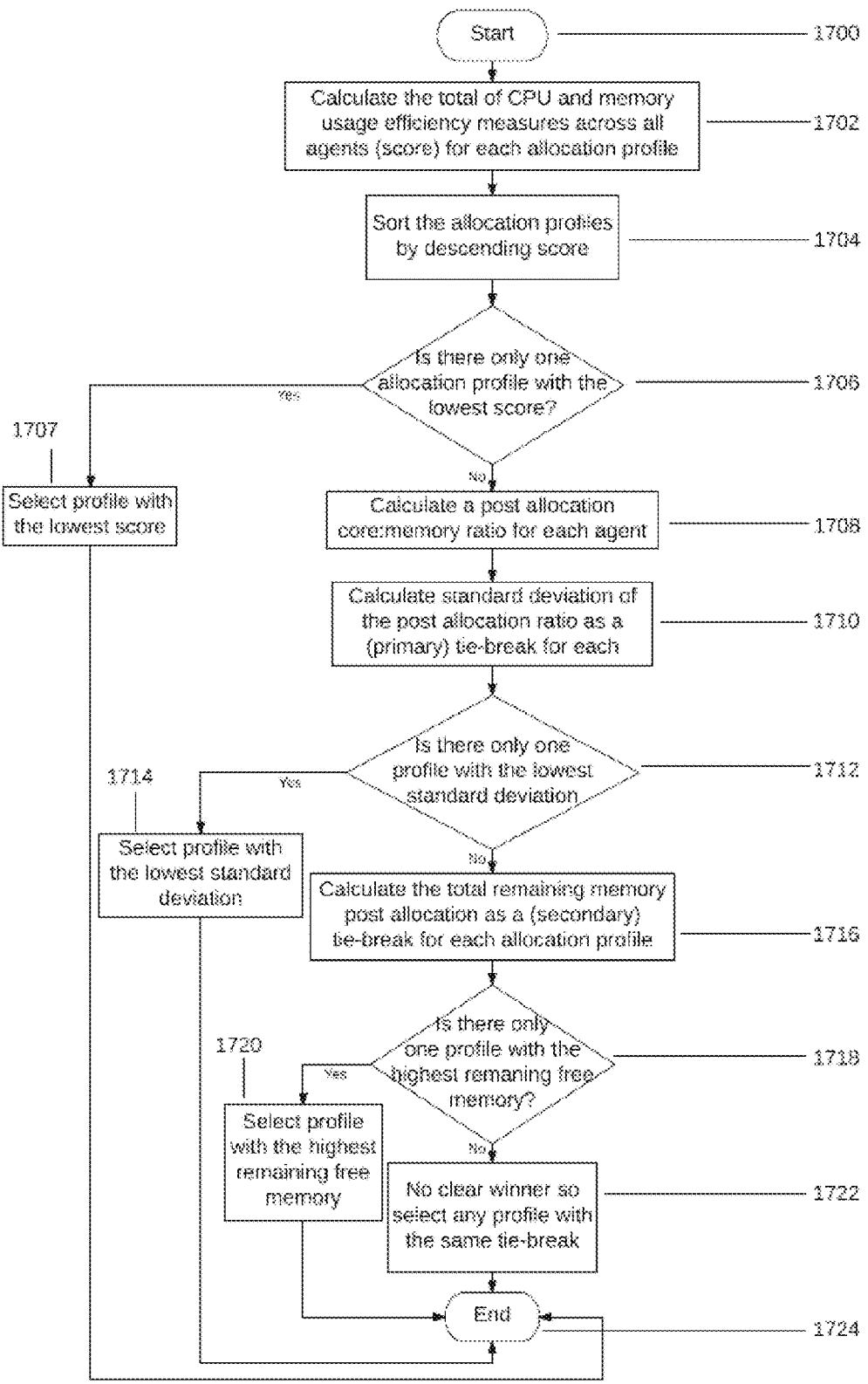
FIG. 17 is a flow chart showing a method of selecting an allocation profile using calculated memory usage and CPU usage efficiency measures, according to some embodiments of the invention.

FIGS. 16 and 17 show examples of series of operations that may be performed at computer 1401, for example by the agent manager 1406, to select a resource allocation profile according to some embodiments of the invention.

After initiation or start up at operation 1600, a request may be received at operation 1602 to perform a task. The request may specify the number of CPU cores and the amount of memory required to perform the task. This may include a baseline amount of memory, in which case there may be no requirement for an additional amount of memory per core.

At operation 1604 multiple allocation profiles may be determined. Each profile may describe a possible allocation of cores and memory to the task, for example from currently available cores and memory associated with the agents 1421, 1422, 1423, for example as notified to the agent manager 1406 by the agents. Operation 1604 may include determining all possible allocation profiles capable of fulfilling the request, or a selection of possible allocation profiles.

In operation 1606, successive allocation profiles, for example as determined in operation 1604, may be input into subsequent operations 1608-1612 for the calculation of efficiency measures. At operation 1608, successive agents are input into subsequent operations 1610 and 1612. Thus at operation 1610, for the current allocation profile and the current agent, a memory usage efficiency measure may be determined, for example a memory cost as described herein. At operation 1612, for the current allocation profile and the current agent, a CPU usage efficiency measure may be determined. At operation 1614 a decision may be made as to whether there are agents in the allocation profile for which operations 1610 and 1612 have not been carried out and if so, the flow may return to operation 1608 for operations 1610 and 1612 to be performed on the next agent. Operations 1610 and 1612 may be performed for all agents in the current allocation profile. At operation 1610 a decision may be made as to whether there are allocation profiles, for example as determined at operation 1604, for which operations 1608-1612 have not been carried out and if so, the flow may return to operation 1606 for operations 1608-1612 to be performed on the next allocation profile. Operations 1608-1612 may be performed on all allocation profiles determined at operation 1604.

The memory usage efficiency measures and the CPU usage efficiency measures determined at operations 1610 and 1612 may be used in the selection of an allocation profile at operation 1618. More details of operations that may be performed as part of the selection process are described with reference to FIG. 17.

Following the selection of an allocation profile at operation 1618, the selection may be indicated to the agents by outputting one or more allocation messages, which may be relayed to the agents by the queue manager 1404, following which the series of operations may end at operation 1620.

Referring now to FIG. 17, after initiation at operation 1700, at operation 1702 a score may be determined for each allocation profile, for example the total of CPU usage efficiency measures and memory usage efficiency measures across all agents. The allocation profiles may then be ordered by score at operation 1704. The selected allocation profile may be one of the multiple allocation profiles determined from the total value, or score, to have the maximum efficiency. In this example the efficiency measures may be determined such that the higher the value of the efficiency measure the lower the efficiency. Thus in operation 1706 a decision may be made as to whether there is a single allocation profile with the lowest calculated score, and if so the flow may proceed to operation 1707 in which the allocation profile with the lowest score is selected and notified to the agents in operation 1620. The selection process may then end at operation 1724.

According to some embodiments of the invention, operation 1702 need not be performed for every allocation profile. For example, if the memory usage efficiency measure or the CPU usage efficiency measure alone indicate that a particular allocation profile cannot be preferable to one for which the total has already been calculated in operation 1702, there is no need for the total to be calculated. In other words, according to some embodiments of the invention, the total of the calculated efficiency measures may be calculated only for those profiles likely to have greater efficiency than those profiles for which the total has already been calculated.

If there is no single allocation profile determined to have the maximum efficiency, then one or more further selection processes, or tie breakers, may take place with the intention of identifying a single allocation profile to be selected for implementation. Operations 1708-1714 indicate a first tie break process and operations 1716-1720 indicate a second tie break process. According to some embodiments of the invention the two tie break processes shown in FIG. 17 may be performed in the reverse order.

At operation 1708 a post allocation core/memory ratio may be calculated for each agent. This is the core/memory ratio that would persist if the allocation profile was implemented for the task specified in the request at operation 1602. The distribution of the post-allocation core/memory ratios may be examined at operation 1710, for example by calculating the standard deviation of all non-zero values calculated at operation 1708. Then at operation 1712 it may be determined whether there is a single profile with the most even distribution, for example as determined from the standard deviation, and if so the profile with the most even post-allocation distribution, e.g. the one with the lowest standard deviation, may be selected at operation 1714 following which the series of operations may stop at operation 1724.

If the post-allocation core/memory ratio distribution does not indicate a single allocation profile for selection, then at operation 1716 the total remaining memory may be determined for each allocation profile or for each allocation profile having the most even post-allocation memory/core distribution, following which at operation 1718 it may be determined whether there is a single allocation profile that has the most post-allocation memory remaining and if so this profile may be selected at operation 1720, following which the series of operations may stop at operation 1724.

If no single allocation profile has been selected following operation 1718, a random selection may be made, at operation 1722, for example, of any profile with the highest memory and lowest post-allocation core/memory ratio distribution, following which the series of operations may stop at operation 1724.

Figure 18:
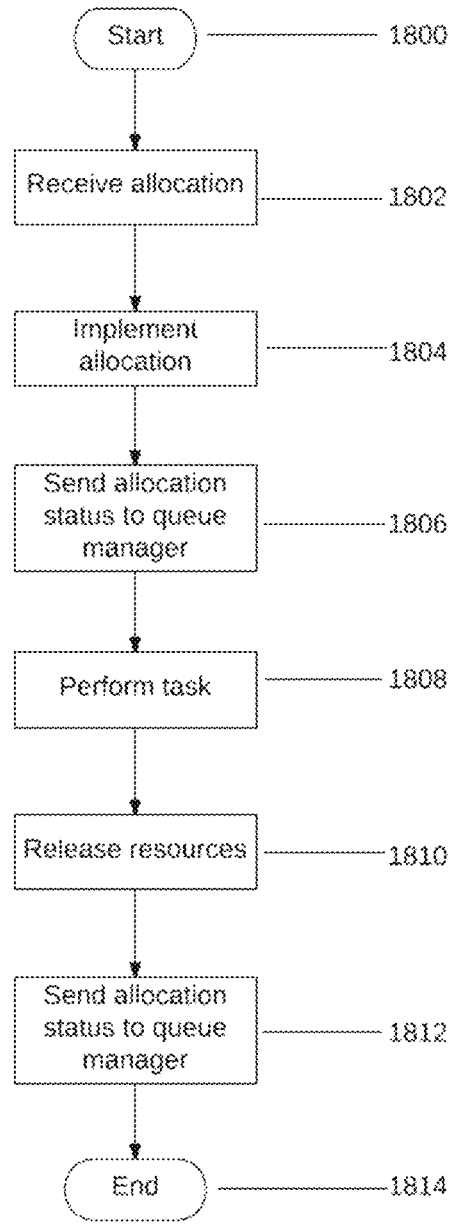
FIG. 18 shows a series of operations that may be performed by an agent according to some embodiments of the invention.

FIG. 18 shows a series of operations that may be performed by an agent according to some embodiments of the invention. After initiation at operation 1800, an agent may be ready to receive allocation messages, for example from agent manager 1406 via queue manager 1404. An allocation message may be received by an agent at operation 1802. In response to the message, at operation 1804 the agent may implement the allocation by allocating resources to a task. At operation 1806 the agent may update the queue manager 1404 as to its status for example via the regular heartbeat messages.

The task may then be performed under the control of the agent at operation 1808, and on completion of the task the allocated resources may be released at operation 1810 and the agent may then send its new allocation status to the queue manager at operation 1812. The process may end at operation 1814.

Example data structures for an agent, allocation, distribution and request objects are given in the following tables. Other or different data structures and objects may be used. Some embodiments of the invention may use other objects which may be for example children of the objects described below or representations of the XML messages.

An agent object may contain the details of an agent, including for example which workers are currently assigned to the agent, for example as per table 2:

TABLE 2 agent

| Field | Type | Description |
|---|---|---|
| ID | String | Unique identifier for the agent |
| Hostname | String | Hostname of the agent |
| Cores | Integer | Number of CPU cores available to the agent |
| Memory | Integer | Amount of memory available to the agent |
| Description | String | A description for the agent |
| Version | String | Version of the agent software running on this agent |
| Status | Enumeration | Current agent status. Can be for example ACTIVE, INACTIVE or UNKNOWN |
| Allocations | Set<Allocation> | Set of allocations currently assigned to this agent |
| Distributions | Set<Distribution> | Set of distributions available on this agent |

An allocation object may be created when the manager, e.g. agent manager 1406, assigns a worker to be executed on an agent, for example according to a selected allocation profile, and may include the example items shown in table 3.

TABLE 3 allocation

| Field | Type | Description |
|---|---|---|
| ID | Long | Unique identifier for the allocation |
| Allocated Cores | Integer | Number of CPU cores assigned to the allocation |
| Allocated Memory | Integer | Amount of memory assigned to the allocation |
| Worker Type | Enumeration | The type of worker executed in the allocation |
| Version | String | The version of the worker software used in the allocation |
| Status | Enumeration | Current status of the allocation. Can be for example RESERVED, IN_USE or RELEASED |
| Archive logs | Boolean | Should the logs created by the worker be archived after the worker completes |
| Purge worker directory | Boolean | Should the directory in which the worker was extracted and executed be removed after the worker completes |
| Logs directory | String | Directory within the worker extraction directory which contains any logs files produced by the worker |
| Allocation properties | Map<String, String> | Map of name/value pairs of any properties passed to the worker |

A distribution object may comprise a compressed, e.g. zipped, file containing binary executable files that make up a transient worker deployment 1424 to be run by an agent. For example, a task may be to perform commission calculations. The software which performs that calculation may be made up of one or more binary files. These binaries files may be packaged into a zip file which then becomes the distribution. That distribution may then be deployed (unzipped) by the agent and then executed. At that point it becomes a transient worker deployment. A distribution object may include the example items shown in table 4.

TABLE 4 distribution

| Field | Type | Description |
|---|---|---|
| ID | Long | Unique identifier for the distribution |
| Name | Enumeration | The type of worker contained in the distribution |
| Version | String | The version of the worker software |
| Filename | String | Filename on disk of the worker |
| Distribution date | Date | Date that the distribution was stored on the agent |
| Failure count | Integer | Number of times that the agent has failed to deploy the distribution |

TABLE 5 request

| Field | Type | Description |
|---|---|---|
| Worker Type | Integer | The type of worker to be started in the cloud |
| Version | String | The version of the worker software to be started |
| Instance ID | String | Unique ID of the requesting software instance |
| Requested Cores | Integer | Number of cores requested from the cloud |
| Memory Per Core | Integer | Amount of memory per core requested from the cloud |
| Startup memory | Integer | Amount of base memory requested from the cloud regardless of how many cores are allocated |
| Archive Log Files | Boolean | Should the worker's log files be archived after execution is complete |
| Purge Worker Directory | Boolean | Should the worker's working directory be deleted after execution is complete |
| Worker Properties | Map<String, String> | Map of name/value pairs containing any properties that should be passed through to the task when it is deployed |

The following are examples of the XML messages which may be exchanged between components of a computing system as shown in FIG. 14, for example from a requesting computer 1401 to agent manager 1406 or between agent manager 1406 and agents 1421, 1422, 1423, for example to control execution of one or more computing tasks within the grid (other languages and code may be used). Effectively they are XML representations of the objects defined in the tables above.

```
<?xml version="1.0"?>
<resource-request>
  <workertype>123</workertype>
  <version>1.2.3.4</version>
  <requestedcores>8</requestedcores>
  <memorypercore>2048</memorypercore>
  <startupmemoryoverhead>512</startupmemoryoverhead>
  <archivelogs>false</archivelogs>
  <purgeworkerdirectory>true</purgeworkerdirectory>
  <logsdirectory>logs</logsdirectory>
  <properties>
```

```
    <configUrl>http://localhost:4433/globalconfig</configUrl>
  </properties>
</resource-request>
<?xml version="1.0"?>
<heartbeat>
    <uuid>12345</uuid>
    <hostname>dave</hostname>
    <cores>4</cores>
    <status>ACTIVE</status>
    <memory>2048</memory>
    <description>I am a cloud agent</description>
</heartbeat>
<?xml version="1.0"?>
<deployment>
    <uuid>007</uuid>
    <deploymentid>1</deploymentid>
    <numcores>8</numcores>
    <memory>1024</memory>
    <workertype>0</workertype>
    <version>36</version>
    <archivelogs>true</archivelogs>
    <purgeworkerdirectory>true</purgeworkerdirectory>
    <logdirectory>logs</logdirectory>
    <properties>
       <prop1>banana</prop1>
       <prop2>apple</prop2>
    </properties>
</deployment>
```

It will be noted that the distribution message may include "Purge Worker directory" and "Archive logs" directives to control what happens once a task has been completed and ensure that a new version of the Worker implementation is used for the next instance of a task.

A system according to some embodiments of the invention may improve any of the functioning, memory usage and operating speed of a computing system, for example by ensuring that resources are used as efficiently as possible leaving maximum availability for performance of further tasks after allocation of resources to a particular task. For example, embodiments of the invention may provide far greater processing speed than a system in which resources are permanently reserved for particular tasks. A system according to some embodiments of the invention may include components such as, but not limited to, a plurality of central processing units (CPU), e.g., similar to controller 1505, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method in a computing system of allocating, to a task, memory and central processing unit ("CPU") cores, wherein the computing system is configured to implement a plurality of agents each associated with a predetermined number of CPU cores and a predetermined amount of memory, the method comprising:
   receiving a request for the system to perform a task, wherein the request specifies a number of CPU cores and an amount of memory for performing the task;
   determining multiple allocation profiles, each describing a possible allocation of cores and memory to the task from currently available CPU cores and memory associated with the agents;
   for each of the agents and for each of said allocation profiles, calculating respective efficiency measures for memory usage and CPU usage; and
   selecting an allocation profile using said calculated memory usage and CPU usage efficiency measures.

2. The method of claim 1 wherein the selected allocation profile is one of the multiple allocation profiles determined from said efficiency measures to have a maximum efficiency.

3. The method according to claim 1 comprising, for each allocation profile, calculating a total of the calculated efficiency measures for CPU and memory usage across all of said agents, wherein said selected allocation profile is one of the multiple allocation profiles determined from said total to have a maximum efficiency.

4. The method according to claim 2 comprising:
   identifying more than one possible allocation profile having the maximum efficiency; and
   selecting between said more than one possible allocation profiles on a basis of remaining memory distribution after allocation.

5. The method according to claim 3 comprising, for respective ones of at least some of said identified allocation profiles, calculating for each of the agents a post allocation core to memory ratio remaining after implementation of the possible allocation, and analysing a distribution of said post allocation core to memory ratios;
   wherein said selected allocation profile is one of the identified allocation profiles having a minimum distribution of post allocation core to memory ratios.

6. The method according to claim 5 wherein analysing the distribution comprises calculating a standard deviation of a post allocation core to memory ratios;
   wherein said selected allocation profile is one of the identified allocation profiles having a minimum calculated standard deviation of post allocation core to memory ratios.

7. The method according to claim 2 comprising:
   identifying more than one possible allocation profile having the maximum efficiency determined from a total of the calculated efficiency measures for CPU and memory usage across all of said agents;
   for respective ones of at least some of said identified allocation profiles, calculating for each of the agents a total remaining memory after implementation of the possible allocation;

wherein said selected allocation profile is one of the identified allocation profiles having the maximum calculated total remaining memory.

8. The method according to claim 1 wherein the calculation of a memory efficiency measure comprises comparing an amount of memory allocated in a particular allocation profile to an amount of memory corresponding to an optimal allocation ratio of memory to cores for the number of currently available CPU cores.

9. The method according to claim 1 wherein the request specifies a core to memory ratio and the calculation of a CPU usage efficiency measure comprises determining a number of CPU cores remaining after, according to the core to memory ratio specified in the request, all usable cores have been allocated according to the core to memory ratio specified in the request.

10. A computing system comprising a plurality of processors and memory, configured to implement an agent manager and a plurality of agents, each of the agents being associated with a predetermined number of central processing unit "CPU" cores and a predetermined amount of memory, wherein the agent manager is configured to:
receive a request for the system to perform a task, wherein the request indicates a number of CPU cores and amount of memory for performing the task;
determine multiple allocation profiles, each describing a possible allocation of cores and memory to the task from currently available CPU cores and memory at the agents;
for each of the agents and for each of said allocation profiles, calculate respective efficiency measures for memory usage CPU usage;
select an allocation profile using said calculated memory usage and CPU usage efficiency measures; and
communicate the selected allocation profile to agents described in the selected allocation profile.

11. The computing system of claim 10 wherein the agent manager is configured to calculate an efficiency score for each of said multiple allocation profiles using said calculated efficiency measures and to select an allocation profile from said multiple allocation profiles determined from said efficiency score to have a maximum efficiency.

12. The computing system of claim 11 wherein the agent manager is configured to select between multiple allocation profiles determined from said efficiency score to have the maximum efficiency.

13. The computing system of claim 12 wherein the selection between multiple allocation profiles determined from said efficiency score to have the maximum efficiency is based on one or both of distribution of post allocation core to memory ratios across agents and total remaining memory across all agents.

14. The computing system of claim 10 configured to include a queue manager to receive incoming requests and forward them to the agent manager according to availability of resources at the agents.

15. The computing system of claim 10 in which the agents are configured to allocate resources for the performance of the task according to the allocation profile, and to release the allocated resources on completion of the task.

16. The computing system of claim 15 in which the agents are configured to communicate availability of resources associated with them to the agent manager.

17. The computing system of claim 16 including a queue manager wherein the availability of resources is communicated to the agent manager via the queue manager.

18. A method in a computing system of allocating, to a task, memory and central processing unit ("CPU") cores, the method comprising:
receiving a request for the system to perform a task, wherein the request specifies a number of CPU cores and an amount of memory for performing the task;
determining multiple allocation profiles, each describing a possible allocation of cores and memory to the task from currently available CPU cores and memory;
for each of said allocation profiles, calculating a respective efficiency measure for memory usage and CPU usage; and
selecting an allocation profile using said calculated memory usage and CPU usage efficiency measures.

19. The method according to claim 18 wherein the calculation of a memory efficiency measure is based on relative amounts of memory allocated in a particular allocation profile of the multiple allocation profiles and memory corresponding to an optimal allocation ratio of memory to cores for the number of currently available CPU cores.

20. The method according to claim 18 wherein the request specifies a core to memory ratio and the calculation of a CPU usage efficiency measure comprises determining a number of CPU cores remaining after, according to the core to memory ratio specified in the request, all currently available and usable CPU cores have been allocated according to the core to memory ratio specified in the request.

* * * * *